US012720615B2

(12) United States Patent
Takarabe

(10) Patent No.: US 12,720,615 B2
(45) Date of Patent: Aug. 25, 2026

(54) COMMUNICATION APPARATUS CONFIGURED TO COMMUNICATE WITH AN INFORMATION PROCESSING APPARATUS TO RECEIVE CONNECTION INFORMATION TO ESTABLISH A CONNECTION WITH AN ACCESS POINT

(71) Applicant: CANON KABUSHIKI KAISHA, Tokyo (JP)

(72) Inventor: Kei Takarabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 961 days.

(21) Appl. No.: 18/045,763

(22) Filed: Oct. 11, 2022

(65) Prior Publication Data

US 2023/0117870 A1 Apr. 20, 2023

(30) Foreign Application Priority Data

Oct. 15, 2021 (JP) ................................ 2021-169499

(51) Int. Cl.

*H04W 12/06* (2021.01)
*H04W 4/50* (2018.01)
*H04W 12/50* (2021.01)
*H04W 76/10* (2018.01)
*H04W 84/12* (2009.01)

(52) U.S. Cl.

CPC ............ *H04W 76/10* (2018.02); *H04W 84/12* (2013.01)

(58) Field of Classification Search

CPC ..... H04W 76/10; H04W 84/12; H04W 12/06; H04W 12/50; H04W 4/50

See application file for complete search history.

(56) References Cited

U.S. PATENT DOCUMENTS

2020/0413403 A1 12/2020 Umehara
2021/0037160 A1* 2/2021 Watanabe .......... H04N 1/00909

FOREIGN PATENT DOCUMENTS

EP 4050920 A1 8/2022
EP 4050921 A1 8/2022
JP 2016127545 A 7/2016
JP 2017183928 A 10/2017

(Continued)

*Primary Examiner* — Joseph E Dean, Jr.

(74) *Attorney, Agent, or Firm* — Canon U.S.A., Inc. IP Division

(57) ABSTRACT

A communication apparatus includes an output unit configured to, in a case where a start condition of a predetermined state to receive connection information from the information processing apparatus is a first condition, output a predetermined notification, and in a case where the start condition of the predetermined state is a second condition different from the first condition, not output the predetermined notification, the connection information being intended to establish a connection between the communication apparatus and an access point outside the information processing apparatus and outside the communication apparatus, and a setting unit configured to, in a case where a first input is made in response to the predetermined notification, execute predetermined processing configured to establish the connection with the access point, and in a case where a second input is made in response to the predetermined notification, not execute the predetermined processing.

22 Claims, 14 Drawing Sheets

(56) References Cited

FOREIGN PATENT DOCUMENTS

| | | | |
|---|---|---|---|
| JP | 2017212504 | A | 11/2017 |
| JP | 2018046435 | A | 3/2018 |
| JP | 2019180037 | A | 10/2019 |
| JP | 2021005837 | A | 1/2021 |
| JP | 2021057706 | A | 4/2021 |
| WO | 2020092971 | A1 | 5/2020 |

* cited by examiner

101
DISPLAY UNIT
108
OUTPUT INTERFACE
107
ROM
104
CPU
103
INPUT INTERFACE
102
KEYBOARD
109
SHORT-RANGE WIRELESS COMMUNICATION UNIT
111
COMMUNICATION UNIT
110
EXTERNAL STORAGE DEVICE
106
RAM
105
ACCESS POINT
131
151
SHORT-RANGE WIRELESS COMMUNICATION UNIT
157
COMMUNICATION UNIT
156
PRINT ENGINE
155
OUTPUT INTERFACE
160
INPUT INTERFACE
158
CPU
154
RAM
153
ROM
152
DISPLAY UNIT
161
OPERATION UNIT
159

FIG.8

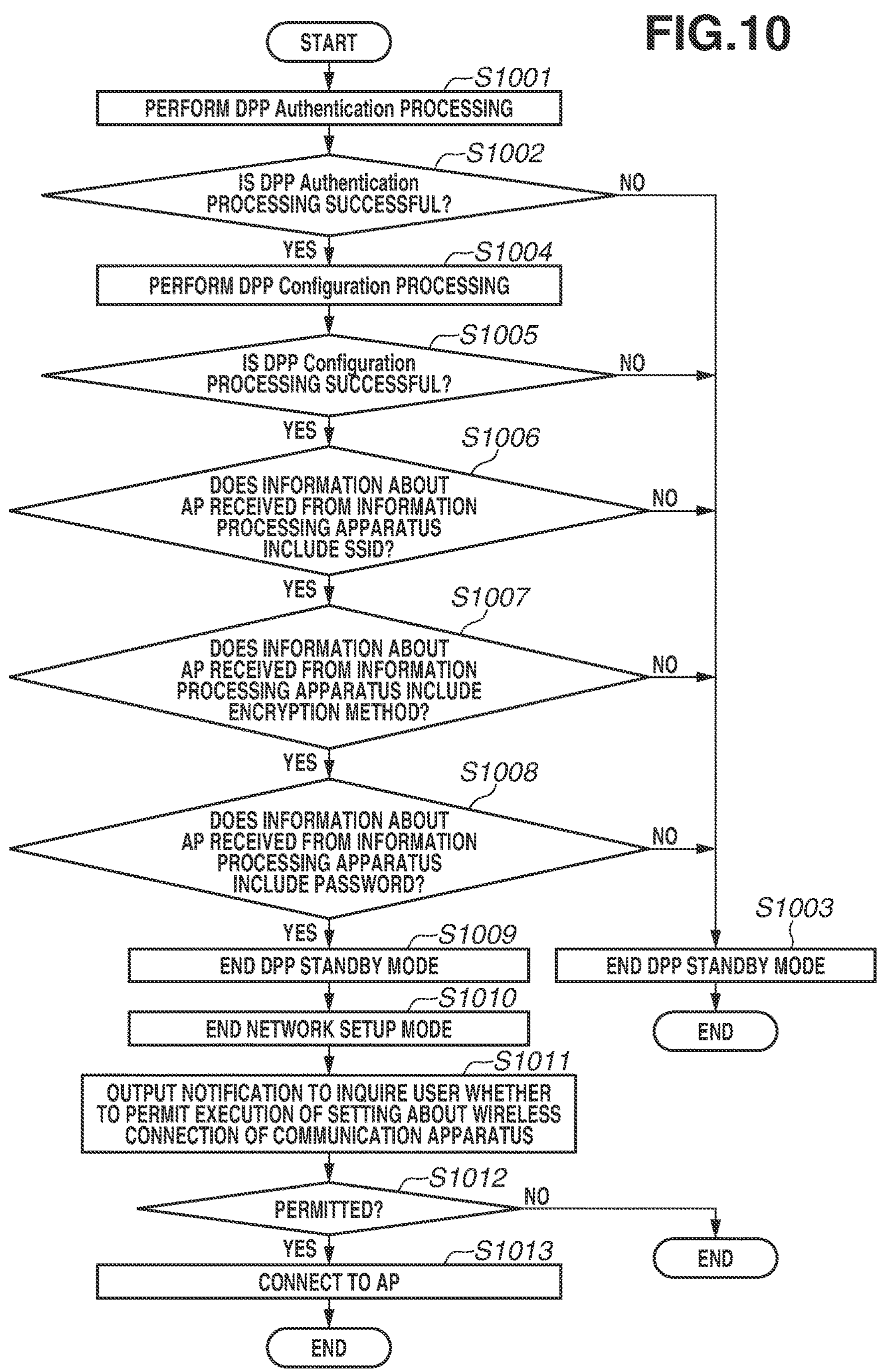
FIG.10
START
S1001
PERFORM DPP Authentication PROCESSING
S1002
IS DPP Authentication PROCESSING SUCCESSFUL?
NO
YES
S1004
PERFORM DPP Configuration PROCESSING
S1005
IS DPP Configuration PROCESSING SUCCESSFUL?
NO
YES
S1006
DOES INFORMATION ABOUT AP RECEIVED FROM INFORMATION PROCESSING APPARATUS INCLUDE SSID?
NO
YES
S1007
DOES INFORMATION ABOUT AP RECEIVED FROM INFORMATION PROCESSING APPARATUS INCLUDE ENCRYPTION METHOD?
NO
YES
S1008
DOES INFORMATION ABOUT AP RECEIVED FROM INFORMATION PROCESSING APPARATUS INCLUDE PASSWORD?
NO
YES
S1009
END DPP STANDBY MODE
S1003
END DPP STANDBY MODE
END
S1010
END NETWORK SETUP MODE
S1011
OUTPUT NOTIFICATION TO INQUIRE USER WHETHER TO PERMIT EXECUTION OF SETTING ABOUT WIRELESS CONNECTION OF COMMUNICATION APPARATUS
S1012
PERMITTED?
NO
END
YES
S1013
CONNECT TO AP
END

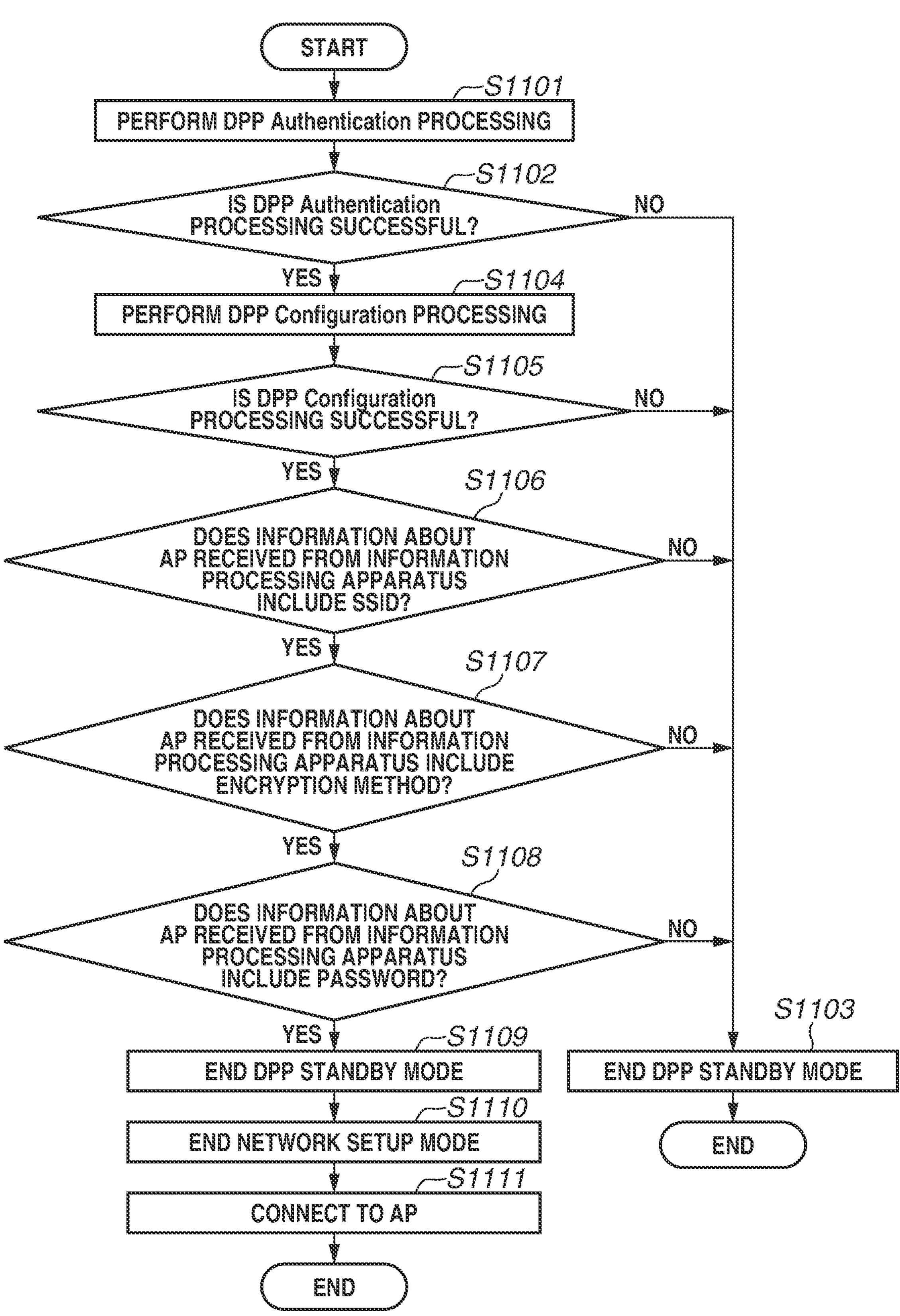
FIG.11
START
S1101
PERFORM DPP Authentication PROCESSING
S1102
IS DPP Authentication PROCESSING SUCCESSFUL?
NO
YES
S1104
PERFORM DPP Configuration PROCESSING
S1105
IS DPP Configuration PROCESSING SUCCESSFUL?
NO
YES
S1106
DOES INFORMATION ABOUT AP RECEIVED FROM INFORMATION PROCESSING APPARATUS INCLUDE SSID?
NO
YES
S1107
DOES INFORMATION ABOUT AP RECEIVED FROM INFORMATION PROCESSING APPARATUS INCLUDE ENCRYPTION METHOD?
NO
YES
S1108
DOES INFORMATION ABOUT AP RECEIVED FROM INFORMATION PROCESSING APPARATUS INCLUDE PASSWORD?
NO
YES
S1109
END DPP STANDBY MODE
S1110
END NETWORK SETUP MODE
S1111
CONNECT TO AP
END
S1103
END DPP STANDBY MODE
END

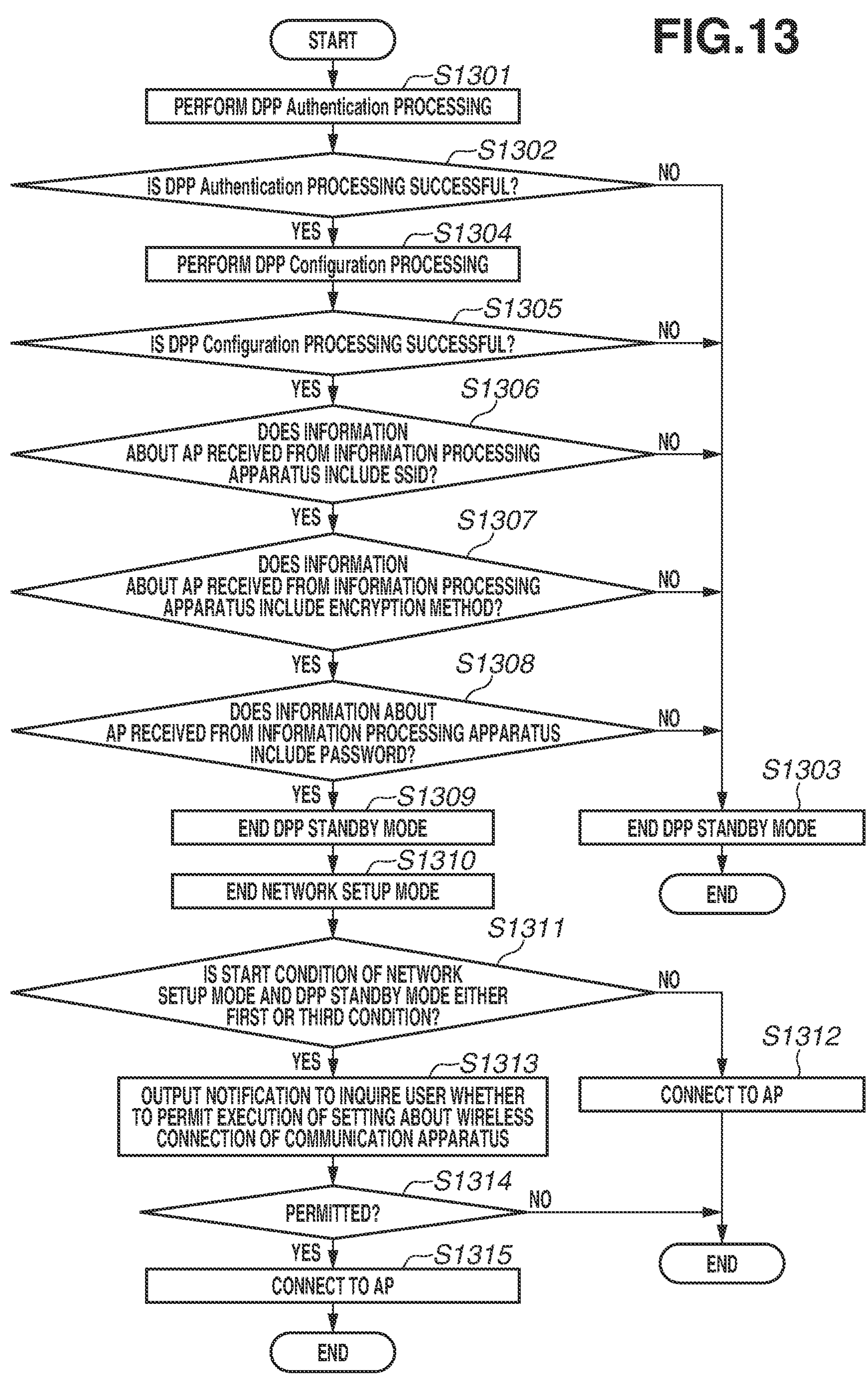
FIG.13
START
S1301
PERFORM DPP Authentication PROCESSING
S1302
IS DPP Authentication PROCESSING SUCCESSFUL?
NO
YES
S1304
PERFORM DPP Configuration PROCESSING
S1305
IS DPP Configuration PROCESSING SUCCESSFUL?
NO
YES
S1306
DOES INFORMATION ABOUT AP RECEIVED FROM INFORMATION PROCESSING APPARATUS INCLUDE SSID?
NO
YES
S1307
DOES INFORMATION ABOUT AP RECEIVED FROM INFORMATION PROCESSING APPARATUS INCLUDE ENCRYPTION METHOD?
NO
YES
S1308
DOES INFORMATION ABOUT AP RECEIVED FROM INFORMATION PROCESSING APPARATUS INCLUDE PASSWORD?
NO
YES
S1309
END DPP STANDBY MODE
S1303
END DPP STANDBY MODE
END
S1310
END NETWORK SETUP MODE
S1311
IS START CONDITION OF NETWORK SETUP MODE AND DPP STANDBY MODE EITHER FIRST OR THIRD CONDITION?
NO
YES
S1312
CONNECT TO AP
S1313
OUTPUT NOTIFICATION TO INQUIRE USER WHETHER TO PERMIT EXECUTION OF SETTING ABOUT WIRELESS CONNECTION OF COMMUNICATION APPARATUS
S1314
PERMITTED?
NO
YES
END
S1315
CONNECT TO AP
END

COMMUNICATION APPARATUS CONFIGURED TO COMMUNICATE WITH AN INFORMATION PROCESSING APPARATUS TO RECEIVE CONNECTION INFORMATION TO ESTABLISH A CONNECTION WITH AN ACCESS POINT

BACKGROUND

Field

The present disclosure relates to a communication apparatus and a method for controlling the same.

Description of the Related Art

A technique where an information processing apparatus, such as a personal computer (PC), transmits information about an access point (external apparatus) to a communication apparatus, such as a printer, and connects the communication apparatus and the external apparatus has been known (Japanese Patent Application Laid-Open No. 2016-127545).

To promote widespread use of the function of transmitting connection information for connecting to an access point to a communication apparatus and connecting the communication apparatus and the access point, an improvement in the convenience of the function has been desired.

SUMMARY

Various embodiments of the present disclosure are directed to improving the convenience of the function of connecting a communication apparatus and an access point.

According to one embodiment of the present disclosure, a communication apparatus configured to communicate with an information processing apparatus includes an output unit configured to, in a case where a start condition of a predetermined state to receive connection information from the information processing apparatus is a first condition, output a predetermined notification, and in a case where the start condition of the predetermined state is a second condition different from the first condition, not output the predetermined notification, the connection information being intended to establish a connection between the communication apparatus and an access point outside the information processing apparatus and outside the communication apparatus, and a setting unit configured to, in a case where a first input is made in response to the predetermined notification, execute predetermined processing configured to establish the connection with the access point, and in a case where a second input is made in response to the predetermined notification, not execute the predetermined processing.

Further features of the present disclosure will become apparent from the following description of exemplary embodiments with reference to the attached drawings.

BRIEF DESCRIPTION OF THE DRAWINGS

FIG. 8 is a flowchart illustrating a procedure for second setup processing the communication apparatus performs in the network setup processing.

FIG. 10 is a flowchart illustrating WEC execution processing.

FIG. 11 is a flowchart illustrating WEC execution processing.

FIG. 13 is a flowchart illustrating WEC execution processing.

DESCRIPTION OF THE EMBODIMENTS

Figure 1:
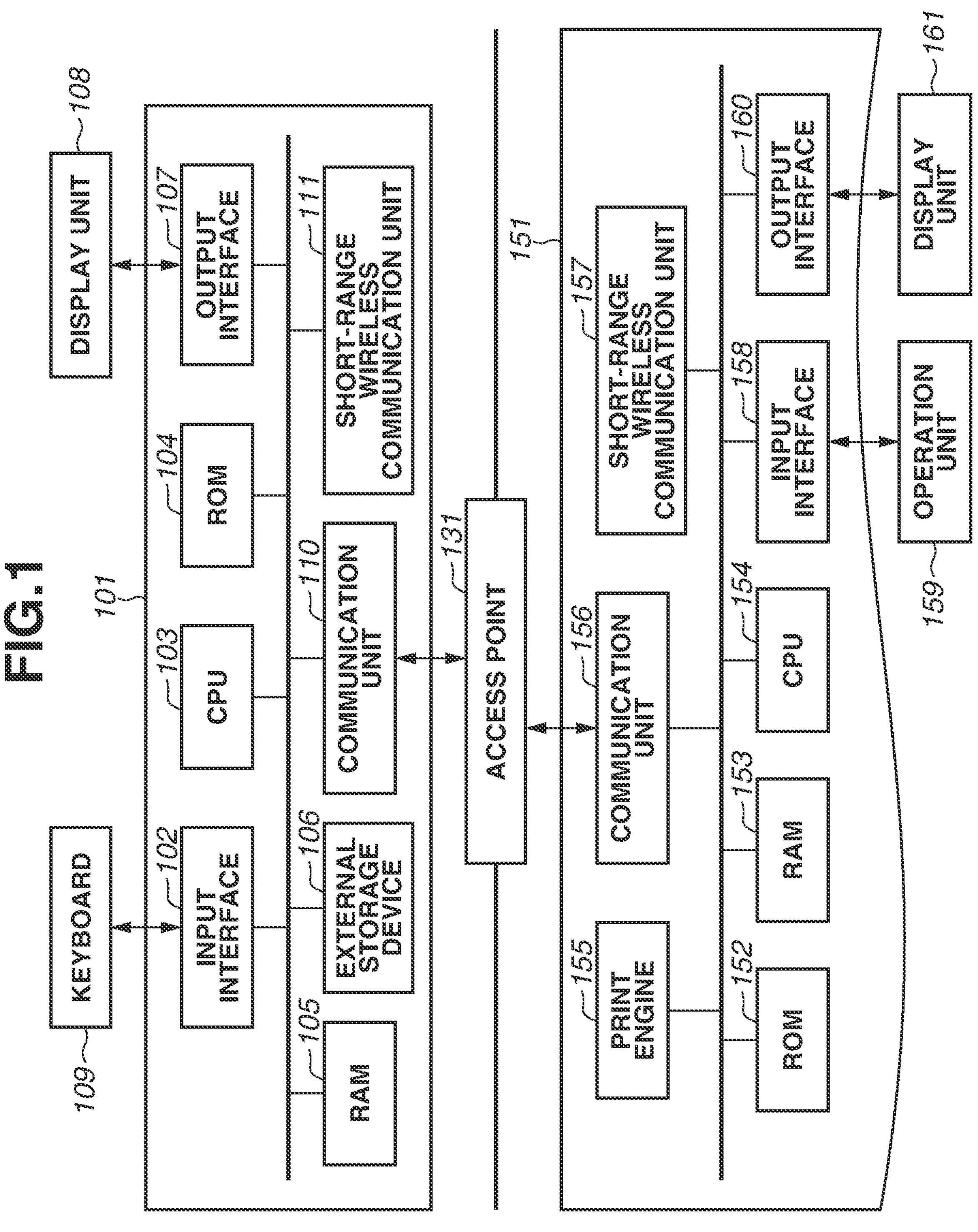
FIG. 1 is a diagram illustrating a configuration of an information processing apparatus, a communication apparatus, and an access point.

Exemplary embodiments of the present disclosure will be described below with reference to the drawings. It should be understood that modifications and improvements made of the following exemplary embodiments as appropriate based on the ordinary knowledge of those skilled in the art without departing from the gist of the present disclosure are also embraced within the scope of the present disclosure.

An information processing apparatus and a communication apparatus included in a communication system according to an exemplary embodiment will be described. In the present exemplary embodiment, a smartphone is described as an example of the information processing apparatus. However, this is not restrictive. For example, various apparatuses such as a mobile terminal, a personal computer (PC), a tablet terminal, a personal digital assistant (PDA), and a digital camera can be applied as the information processing apparatus. In the present exemplary embodiment, a printer is described as an example of the communication apparatus. However, this is not restrictive, and various apparatuses capable of performing wireless communication with the information processing apparatus can be applied. Examples of applicable apparatuses include printers such as an inkjet printer, a full-color laser printer, and a monochrome printer. Examples of applicable apparatuses other than printers may include a copying machine, a facsimile apparatus, a mobile terminal, a smartphone, a laptop PC, a tablet terminal, a PDA, a digital camera, a music player device, a television set, and a smart speaker. A multifunction peripheral having a plurality of functions such as a copying function, a facsimile (FAX) function, and a print function is also applicable.

In the present exemplary embodiment, if the information processing apparatus supports a function called Wireless Fidelity (Wi-Fi) Easy Connect (WEC) (registered trademark), the information processing apparatus can execute the WEC function. WEC is a function of performing a network setup of another apparatus using the Device Provisioning Protocol (DPP) formulated by the Wi-Fi Alliance. Specifically, the network setup of another apparatus refers to processing for connecting another apparatus to an access point forming a network. In WEC, an apparatus operating as a "configurator" (hereinafter, configurator apparatus) and an apparatus operating as an "enrollee" (hereinafter, enrollee apparatus) communicate with each other. In the present exemplary embodiment, the configurator apparatus is a DPP initiator, and the enrollee apparatus is a DPP responder. The configurator apparatus obtains bootstrapping information from the enrollee apparatus. The bootstrapping information includes, for example, identification information (such as a media access control [MAC] address) about the enrollee apparatus and public key information used to perform secure communication with the enrollee apparatus. In the present exemplary embodiment, the bootstrapping information will be described as "WEC-related information". Other information may also be handled as WEC-related information. The configurator apparatus then performs wireless communication with the enrollee apparatus using the obtained bootstrapping information. Specifically, for example, the configurator apparatus communicates with the enrollee apparatus using the public key included in the bootstrapping information. The configurator apparatus further generates a common key based on information obtained by the communication, and transmits information encrypted with the common key to the enrollee apparatus. A specific example of the information transmitted here is connection information for connecting to an access point. The enrollee apparatus then establishes a wireless connection with the access point using the connection information received from the configurator apparatus. In WEC-based network setup processing according to the present exemplary embodiment, an information processing apparatus supporting WEC will be described to operate as a configurator apparatus, and a communication apparatus supporting WEC as an enrollee apparatus.

A configuration of the information processing apparatus according to the present exemplary embodiment and the communication apparatus capable of communicating with the information processing apparatus according to the present exemplary embodiment will be described with reference to the block diagram of FIG. 1. While the present exemplary embodiment is described by using the following configuration as an example, the present exemplary embodiment is applicable to apparatuses capable of communicating with a communication apparatus, and the functions are not limited to those illustrated in the diagram in particular.

An information processing apparatus 101 is an information processing apparatus according to the present exemplary embodiment. The information processing apparatus 101 includes an input interface 102, a central processing unit (CPU) 103, a read-only memory (ROM) 104, a random access memory (RAM) 105, an external storage device 106, an output interface 107, a display unit 108, a communication unit 110, and a short-range wireless communication unit 111. The CPU 103, the ROM 104, and the RAM 105 constitute a computer of the information processing apparatus 101.

The input interface 102 is an interface for accepting data input and operation instructions from the user through operation on an operation unit such as a keyboard 109. The operation unit may be a physical keyboard or physical buttons. The operation unit may be a software keyboard or software buttons displayed on the display unit 108. In other words, the input interface 102 may accept an input (operation) from the user via the display unit 108.

The CPU 103 is a system control unit and controls the entire information processing apparatus 101.

The ROM 104 stores fixed data such as control programs for the CPU 103 to execute, data tables, and embedded operating system (OS) programs. In the present exemplary embodiment, various control programs stored in the ROM 104 implement software execution control such as scheduling, task switching, and interrupt handling under management of the embedded OS stored in the ROM 104.

The RAM 105 includes a static RAM (SRAM) with a backup power supply. The RAM 105 retains data using a not-illustrated primary battery for data backup, and can thus store important data such as program control variables in a nonvolatile manner. The RAM 105 also includes a memory area for storing setting information about the information processing apparatus 101 and management data on the information processing apparatus 101. The RAM 105 is also used as a main memory and a work memory of the CPU 103.

The external storage device 106 stores an application program for performing a network setup of a communication apparatus 151 (hereinafter, referred to as a setting application) and a print information generation program for generating print information interpretable by the communication apparatus 151. The setting application is an application program for making settings of the access point for the communication apparatus 151 to connect to using WEC. The setting application may also have functions other than the network setup function. For example, the setting application may have a function of causing the communication apparatus 151 to print, a function of causing the communication apparatus 151 to scan a set document, and a function of checking the state of the communication apparatus 151. The setting application is installed from an external server by Internet communication via the communication unit 110, for example, and thereby stored in the external storage device 106. The external storage device 106 also stores various programs such as an information transmission and reception control program for transmitting and receiving information to/from the connected communication apparatus 151 via the communication unit 110, and various types of information used by such programs.

The output interface 107 is an interface for controlling data display and notification of the state of the information processing apparatus 101 on the display unit 108.

The display unit 108 includes a light-emitting diode (LED) and a liquid crystal display (LCD), and displays data and issues a notification of the state of the information processing apparatus 101.

The communication unit 110 is a component for connecting to apparatuses such as the communication apparatus 151 and the access point 131, and performing data communication. For example, the communication unit 110 can connect to an access point (not illustrated) in the communication apparatus 151. With the communication unit 110 and the access point in the communication apparatus 151 connected, the information processing apparatus 101 and the communication apparatus 151 can communicate with each other. The communication unit 110 may communicate directly with the communication apparatus 151 by wireless communication, or communicate via an external apparatus outside the information processing apparatus 101 and the communication apparatus 151. Examples of the external apparatus include an external access point (such as the access point 131) outside the information processing apparatus 101 and outside the communication apparatus 151, and an apparatus capable of relaying communication other than access points. In the present exemplary embodiment, the communication unit 110 uses Wi-Fi (registered trademark) that is a wireless communication standard compliant with the Institute of Electrical and Electronics Engineers (IEEE) 802.11 series. The aforementioned WEC is executed by communication via the communication unit 110. Examples of the access point 131 include a device such as a wireless local area network (LAN) router. In the present exemplary embodiment, the method where the information processing apparatus 101 and the communication apparatus 151 are directly connected without the intervention of an external access point will be referred to as a direct connection method. The method where the information processing apparatus 101 and the communication apparatus 151 are connected via an external access point will be referred to as an infrastructure connection method.

The short-range wireless communication unit 111 is a component for connecting wirelessly to an apparatus such as the communication apparatus 151 over a short distance, and performing data communication. The short-range wireless communication unit 111 performs communication using a communication method different from that of the communication unit 110. For example, the short-range wireless communication unit 111 can connect to a short-range wireless communication unit 157 in the communication apparatus 151. Examples of the communication method include Near-Field Communication (NFC), Bluetooth® Classic, Bluetooth® Low Energy, and Wi-Fi Aware.

In the present exemplary embodiment, the information processing apparatus 101 executes WEC by using the OS of the information processing apparatus 101 based on an execution instruction for network setup processing, given by the setting application.

The communication apparatus 151 is a communication apparatus according to the present exemplary embodiment. The communication apparatus 151 includes a ROM 152, a RAM 153, a CPU 154, a print engine 155, a communication unit 156, and the short-range wireless communication unit 157. The ROM 152, the RAM 153, and the CPU 154 constitute a computer of the communication apparatus 151.

The communication unit 156 includes, as the access point inside the communication apparatus 151, an access point for connecting to apparatuses such as the information processing apparatus 101. The access point can connect to the communication unit 110 of the information processing apparatus 101. If the communication unit 156 activates the access point, the communication apparatus 151 operates as an access point. The communication unit 156 may wirelessly connect directly to the information processing apparatus 101, or wirelessly connect via the access point 131. In the present exemplary embodiment, the communication unit 156 uses a wireless communication standard compliant with the IEEE 802.11 series. In the following description, Wi-Fi (registered trademark) (Wi-Fi communication) refers to the communication standard compliant with the IEEE 802.11 series. If the communication apparatus 151 supports WEC, the aforementioned WEC is executed by communication via the communication unit 156. The communication unit 156 may include hardware functioning as an access point, or operate as an access point using software for implementing an access point function.

The communication apparatus 151 according to the present exemplary embodiment can operate in an infrastructure mode and a peer-to-peer (P2P) mode as modes for performing communication using the communication unit 156.

The infrastructure mode is a mode where the communication apparatus 151 communicates with another apparatus such as the information processing apparatus 101 via an external apparatus forming a network (such as the access point 131). The connection the communication apparatus 151 operating in the infrastructure mode establishes with the external access point will be referred to as an infrastructure connection. In the present exemplary embodiment, the communication apparatus 151 in the infrastructure connection operates as a slave station, and the external access point as a master station. In the present exemplary embodiment, the master station refers to an apparatus that determines the communication channel to be used in the network to which the master station belongs. The slave station refers to an apparatus that does not determine the communication channel to be used in the network to which the slave station belongs, but uses the communication channel determined by the master station.

The $P_2P$ mode is a mode where the communication apparatus 151 communicates directly with another apparatus such as the information processing apparatus 101 without the intervention of an external apparatus forming a network. In the present exemplary embodiment, the P2P mode includes an access point (AP) mode where the communication apparatus 151 operates as an AP. Connection information (service set identifier [SSID] and password) about the AP activated inside the communication apparatus 151 in the AP mode can be freely set by the user. Note that the P2P mode may include a Wi-Fi Direct (WFD) mode where the communication apparatus 151 communicates by WFD, for example. Which of WFD-capable devices operates as a master station is determined based on a sequence called Group Owner Negotiation, for example. Note that the master station may be determined without performing Group Owner Negotiation. An apparatus that is WFD-capable and serves as a master station is referred to as a Group Owner in particular. A connection directly established with another apparatus by the communication apparatus 151 operating in the P2P mode will be referred to as a direct connection. In the present exemplary embodiment, the communication apparatus 151 operates as a master station in the direct connection, and another apparatus as a slave station.

In the present exemplary embodiment, the communication apparatus 151 can operate in a network setup mode by accepting the user's predetermined operation. The network setup mode is a mode for performing a network setup of the communication apparatus 151. If the communication apparatus 151 operates in the network setup mode, the communication apparatus 151 uses the communication unit 156 to operate as a setup AP that is active during operation in the network setup mode. The setup AP is an AP different from the one activated in the foregoing AP mode. The setup AP has an SSID including a predetermined character string identifiable by the setting application of the information processing apparatus 101.

The setup AP is an AP that does not need a password for connection. The communication apparatus 151 operating in the network setup mode uses a predetermined communication protocol (setup communication protocol) in communicating with the information processing apparatus 101 connected to the setup AP. A specific example of the setup communication protocol is Simple Network Management Protocol (SNMP). After a lapse of a predetermined time from the start of operation in the network setup mode, the communication apparatus 151 stops operating in the network setup mode and deactivates the setup AP. The reason is that since the setup AP is an AP that does not need a password as described above, a prolonged period of activation increases the possibility of a connection being requested by an inappropriate apparatus. Alternatively, the setup AP may be an AP that uses a password. In such a case, the password used to connect to the setup AP is a fixed password (not modifiable by the user) known to the setting application in advance.

In the present exemplary embodiment, the communication apparatus 151 can also operate in a mode to perform the network setup of the communication apparatus 151 using a communication protocol different from the setup communication protocol by accepting the user's predetermined operation. In the present exemplary embodiment, the communication protocol different from the setup communication protocol refers to the DPP described above, and this mode is referred to as a DPP standby mode. If the communication apparatus 151 is operating in the DPP standby mode and the information processing apparatus 101 receives a request for a network setup using the DPP, the communication apparatus 151 performs a network setup using the DPP as will be described below. In other words, the DPP standby mode is a mode to wait for a request for the network setup using the DPP. The DPP standby mode will be described below with reference to FIG. 9.

The short-range wireless communication unit 157 is a component for connecting wirelessly to an apparatus such as the information processing apparatus 101 over a short distance. For example, the short-range wireless communication unit 157 can connect to the short-range wireless communication unit 111 in the information processing apparatus 101. Examples of the communication method include NFC, Bluetooth® Classic, Bluetooth® Low Energy, and Wi-Fi Aware.

The RAM 153 includes an SRAM with a backup power supply. The RAM 153 retains data using a not-illustrated primary battery for data backup, and can thus store important data such as program control variables in a nonvolatile manner. The RAM 153 also includes a memory area for storing setting information about the communication apparatus 151 and management data on the communication apparatus 151. The RAM 153 is also used as a main memory and a work memory of the CPU 154 to serve as a reception buffer for temporarily storing print information received from the information processing apparatus 101 and store various types of information.

The ROM 152 stores fixed data such as control programs for the CPU 154 to execute, data tables, and OS programs. In the present exemplary embodiment, the control programs stored in the ROM 152 implement software execution control such as scheduling, task switching, and interrupt handling under management of the embedded OS stored in the ROM 152.

The CPU 154 is a system control unit and controls the entire communication apparatus 151.

The print engine 155 forms an image on a recording medium such as a sheet of paper by applying a recording agent such as ink to the recording medium based on information stored in the RAM 153 or a print job received from the information processing apparatus 101, and outputs the print result. In general, a print job transmitted from the information processing apparatus 101 has a large amount of data, and a communication method capable of high speed communication is desirably used to communicate the print job. The communication apparatus 151 thus receives the print job via the communication unit 156 that can communicate faster than the short-range wireless communication unit 157.

A memory such as an external hard disk drive (HDD) and a Secure Digital (SD) card can be attached to the communication apparatus 151 as an optional device. The information to be stored in the communication apparatus 151 may be stored in the memory.

The input interface 158 is an interface for accepting data input and operation instructions from the user through operation on an operation unit 159 such as a physical button. The operation unit 159 may be a software keyboard or software buttons displayed on a display unit 161.

In other words, the input interface 158 may accept the user's input via the display unit 161.

The output interface 160 is an interface for controlling data display and notification of the state of the communication apparatus 151 on the display unit 161.

The display unit 161 includes an LED and an LCD, and displays data and issues a notification of the state of the communication apparatus 151.

Figure 2A:
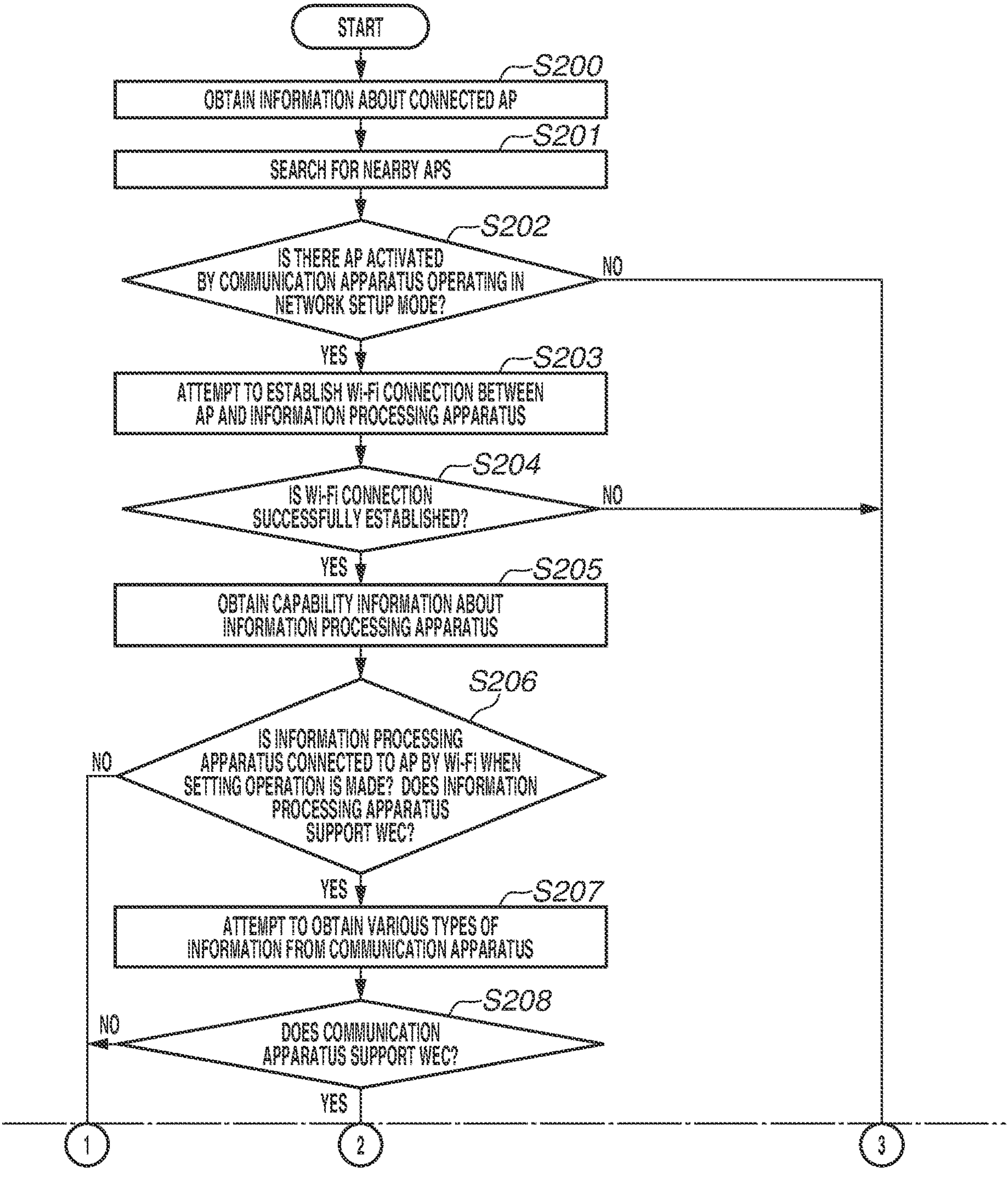
FIGS. 2A and 2B are flowcharts illustrating a processing procedure the information processing apparatus performs in network setup processing.
Figure 2B:
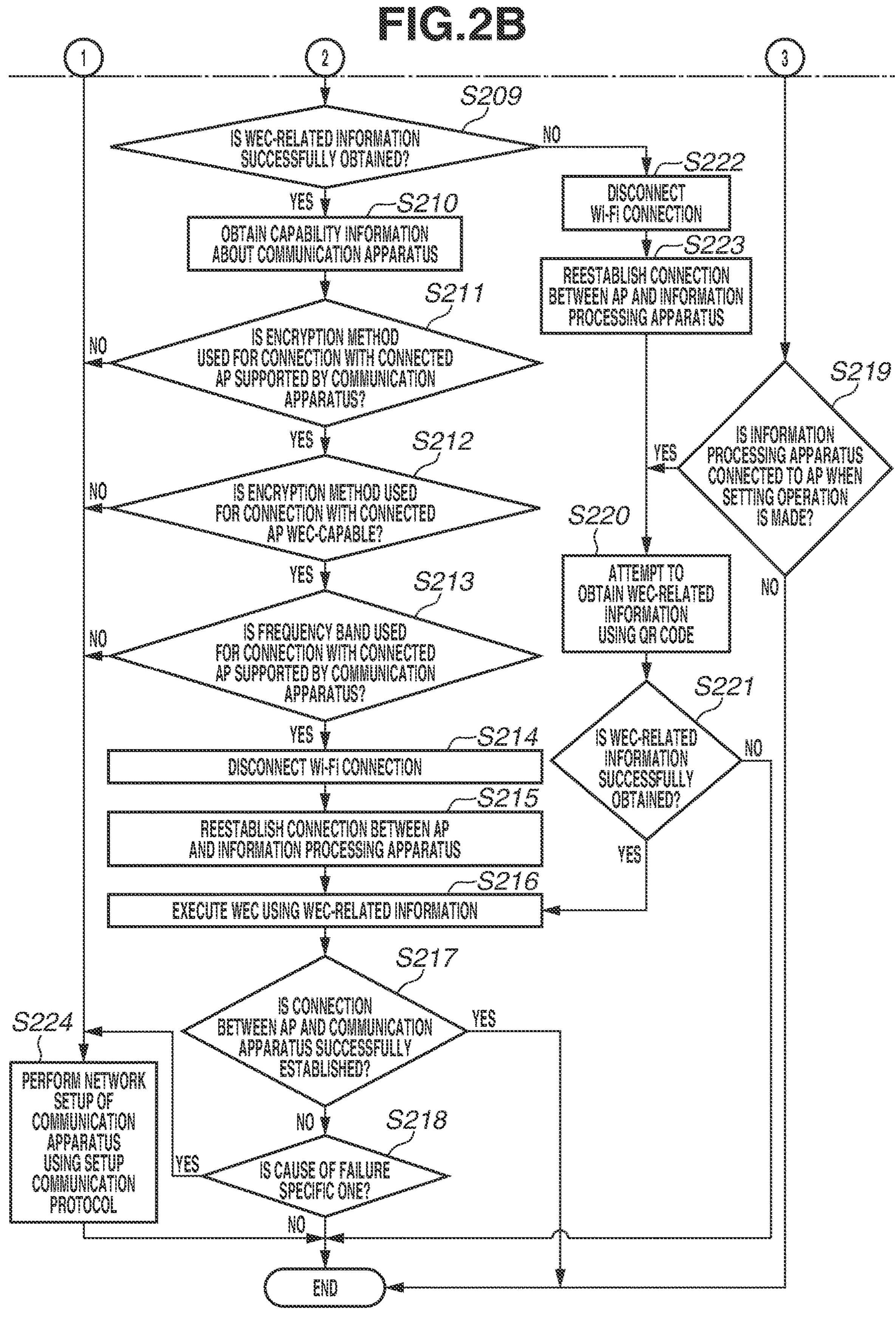

FIG. 2 is a flowchart illustrating a processing procedure the information processing apparatus 101 performs in the network setup processing according to the present exemplary embodiment. The flowchart illustrated in FIG. 2 is implemented, for example, by the CPU 103 reading the setting application stored in the ROM 104 or the external storage device 106 into the RAM 105 and executing the setting application. The flowchart illustrated in FIG. 2 is started based on a predetermined operation (hereinafter, setting operation) for performing a network setup being made on a screen displayed by the setting application.

In step S200, the CPU 103 obtains information about the AP to which the information processing apparatus 101 is wirelessly connected by Wi-Fi at least when the setting operation is made (hereinafter, connected AP). In the present exemplary embodiment, the information processing apparatus 101 does not switch the AP for the information processing apparatus 101 to connect to after the setting operation is made. The connected AP is thus the one to which the information processing apparatus 101 is currently connected in step S200. The information includes information for connecting to the AP to which the information processing apparatus 101 is wirelessly connected by Wi-Fi (information indicating the SSID and the encryption method). The obtained information is stored in a predetermined storage area of the RAM 105 of the information processing apparatus 101. If the information processing apparatus 101 is not connected to any AP by Wi-Fi when the setting operation is made, this processing is omitted.

In step S201, the CPU 103 instructs the OS of the information processing apparatus 101 to search for APs near the information processing apparatus 101, and obtains the search results using the setting application.

In step S202, the CPU 103 determines whether there is an AP activated by a communication apparatus 151 operating in the network setup mode among the search results obtained in step S201. As described above, in the present exemplary embodiment, the SSID of an AP activated by a communication apparatus 151 operating in the network setup mode includes a predetermined character string known to the setting application in advance. Specifically, for this determination, the CPU 103 determines whether there is an AP having an SSID including the predetermined character string among the search results obtained in step S201. If the determination is YES (YES in step S202), the processing proceeds to step S203. If the determination is NO (NO in step S202), the processing proceeds to step S219.

In step S203, the CPU 103 attempts to establish a Wi-Fi connection between the AP activated by the communication apparatus 151 operating in the network setup mode, included in the search results, and the information processing apparatus 101. This Wi-Fi connection corresponds to a Wi-Fi connection between the communication apparatus 151 operating in the network setup mode and the information processing apparatus 101.

In step S204, the CPU 103 determines whether the Wi-Fi connection is successfully established in step S203. If the determination is YES (YES in step S204), the processing proceeds to step S205. If the determination is NO (NO in step S204), the processing proceeds to step S219.

In step S205, the CPU 103 obtains capability information about the information processing apparatus 101 from the OS. In the present exemplary embodiment, the capability information includes information indicating whether the information processing apparatus 101 supports WEC. The content of the capability information varies with the model type and model number of the information processing apparatus 101.

In step S206, the CPU 103 determines whether the information processing apparatus 101 is connected to the AP by Wi-Fi when the setting operation is made, and the information processing apparatus 101 supports WEC. For example, if the information processing apparatus 101 is not connected to the AP by Wi-Fi when the setting operation is made, the determination is NO. For example, if the information processing apparatus 101 is connected to the AP by Wi-Fi when the setting operation is made, but the information processing apparatus 101 does not support WEC, the determination is NO. Whether the information processing apparatus 101 is connected to the AP by Wi-Fi when the setting operation is made is determined based on whether the information about the connected AP is stored in the foregoing predetermined storage area. Whether the information processing apparatus 101 supports WEC is determined based on the content of the capability information obtained in step S205. If the determination is YES (YES in step S206), the processing proceeds to step S207. If the determination is NO (NO in step S206), the processing proceeds to step S224.

In step S207, the CPU 103 attempts to obtain various types of information from the communication apparatus 151 via the Wi-Fi connection between the AP activated by the communication apparatus 151 operating in the network setup mode and the information processing apparatus 101. As described above, the communication via the Wi-Fi connection between the AP activated by the communication apparatus 151 operating in the network setup mode and the information processing apparatus 101 uses the setup communication protocol. Examples of the information obtained here include the foregoing WEC-related information and information indicating whether the communication apparatus 151 supports WEC. The information indicating whether the communication apparatus 151 supports WEC refers to information indicating whether the communication apparatus 151 supports the DPP. If the communication apparatus 151 does not support WEC, information indicating that the communication apparatus 151 does not support WEC is obtained without the WEC-related information. If the communication apparatus 151 does not support WEC, both the WEC-related information and the information indicating whether the communication apparatus 151 supports WEC can sometimes be unavailable. Typically, the WEC-related information can be obtained by the communication apparatus 151 displaying a QR code corresponding to the WEC-related information on the display unit 161 and the information processing apparatus 101 reading the QR code using a camera unit. By contrast, in the present exemplary embodiment, the WEC-related information is obtained via the Wi-Fi connection between the AP activated by the communication apparatus 151 operating in the network setup mode and the information processing apparatus 101. This enables the information processing apparatus 101 to obtain the WEC-related information even in a case where the communication apparatus 151 does not include a display unit for displaying the QR code or the information processing apparatus 101 does not include a camera unit for reading the QR code.

In step S208, the CPU 103 determines whether the communication apparatus 151 supports WEC based on the information obtained in step S207. That the communication apparatus 151 supports WEC means that the communication apparatus 151 supports the foregoing DPP. If information indicating that the communication apparatus 151 supports WEC is obtained, the determination is YES. If the information indicating that the communication apparatus 151 supports WEC is not obtained, the determination is NO. If the determination is YES (YES in step S208), the processing proceeds to step S209. If the determination is NO (NO in step S208), the processing proceeds to step S224. If no information is successfully obtained in step S207, the determination here is NO.

In step S209, the CPU 103 determines whether the WEC-related information is successfully obtained from the communication apparatus 151 in step S207. If the determination is YES (YES in step S209), the processing proceeds to step S210. If the determination is NO (NO in step S209), the processing proceeds to step S222. Examples of the case where the determination is NO include a case where the information indicating that the communication apparatus 151 supports WEC is obtained but the WEC-related information is not, due to a communication error.

In step S210, the CPU 103 obtains the capability information about the communication apparatus 151 via the Wi-Fi connection between the AP activated by the communication apparatus 151 operating in the network setup mode and the information processing apparatus 101. In the present exemplary embodiment, the capability information about the communication apparatus 151 includes at least one or more pieces of information indicating an encryption method or methods supported by the communication apparatus 151 and/or information indicating a frequency band or bands supported by the communication apparatus 151. Examples of the encryption methods supported by the communication apparatus 151 include Wi-Fi Protected Access (WPA), WPA2, and WPA3. The information indicating the frequency band(s) supported by the communication apparatus 151 may be information (channel information) indicating communication channels corresponding to the frequency band(s) supported by the communication apparatus 151. This processing may be omitted in a mode to be described below where no determination is made as to encryption methods or frequency bands supported by the communication apparatus 151. The capability information may be included in the setting application in advance. More specifically, the CPU 103 may identify the capability information corresponding to the communication apparatus 151 in a plurality of pieces of capability information prepared with respect to respective types and model numbers of communication apparatuses and included in the setting application in advance, and obtain the identified capability information from the setting application.

In step S211, the CPU 103 determines whether the encryption method used for the connection with the connected AP is one supported by the communication apparatus 151 based on the capability information obtained in step S210. In the present exemplary embodiment, the encryption methods supported by the communication apparatus 151 are WPA, WPA2, and WPA3, and an encryption method not supported by the communication apparatus 151 is Wired Equivalent Privacy (WEP). If the determination is YES (YES in step S211), the processing proceeds to step S212. If the determination is NO (NO in step S211), the processing proceeds to step S224. Note that such a determination may be made at different timing. Specifically, for example, this determination may be made after the determination of YES in step S204. If the determination is YES, the processing may proceed to step S205. If the determination is NO, the processing may proceed to step S224.

In step S212, the CPU 103 determines whether the encryption method used for the connection with the connected AP is a WEC-capable (DPP-capable) one. Examples of the WEC-capable encryption method include WPA2 and WPA3. Examples of a WEC-incapable encryption method include WPA and WEP. The CPU 103 may find out which encryption method is WEC-capable based on information stored in the setting application in advance, or based on information obtained from the communication apparatus 151. If the determination is YES (YES in step S212), the processing proceeds to step S213. If the determination is NO (NO in step S212), the processing proceeds to step S224.

In step S213, the CPU 103 determines whether the frequency band used for the connection with the connected AP is one supported by the communication apparatus 151 based on the capability information obtained in step S210. In the present exemplary embodiment, some types of communication apparatuses 151 support both 2.4- and 5-GHz frequency bands, and some support the 2.4-GHz frequency band but not the 5-GHz frequency band.

Depending on an unsupported frequency band, the communication apparatus 151 is unable to connect to the AP. For example, if the frequency band used for the connection with the connected AP is the 5-GHz frequency band and the communication apparatus 151 does not support the 5-GHz frequency band, the determination is NO. If the determination is YES (YES in step S213), the processing proceeds to step S214. If the determination is NO (NO in step S213), the processing proceeds to step S224.

In step S214, the CPU 103 issues an instruction to disconnect the Wi-Fi connection between the AP activated by the communication apparatus 151 operating in the network setup mode and the information processing apparatus 101.

In step S215, the CPU 103 reestablishes a connection between the AP to which the information processing apparatus 101 is connected by Wi-Fi when the setting operation is made and the information processing apparatus 101. WEC includes transmitting the information about the AP to which the information processing apparatus 101 is connected when WEC is executed. This processing is thus performed in preparation for the execution of WEC in step S216.

In step S216, the CPU 103 performs processing for executing WEC using the obtained WEC-related information. In the present exemplary embodiment, the setting application does not directly execute WEC but performs processing for activating the OS's standard WEC application program (hereinafter, WEC application) as the processing for executing WEC. The WEC application then executes a WEC application programming interface (API) to issue a WEC execution request to the OS, whereby WEC is performed by the OS. Note that the setting application may execute the WEC API to issue a WEC execution request to the OS. The processing for executing WEC may be the issuance of the execution request itself. Details of this processing will be described below.

In step S217, the CPU 103 determines whether the connection between the AP and the communication apparatus 151 is successfully established by WEC executed. This determination is made based on information about whether the execution of WEC is cancelled as well as information indicating the success or failure of the connection to the AP, obtained from the communication apparatus 151. If the determination is YES (YES in step S217), the processing ends. If the determination is NO (NO in step S217), the processing proceeds to step S218.

In step S218, the CPU 103 determines whether the cause of the failure in establishing the connection between the AP and the communication apparatus 151 by WEC executed is a specific one. In the present exemplary embodiment, information about the cause of the failure in establishing the connection between the AP and the communication apparatus 151 by WEC executed is obtained from the communication apparatus 151, and the CPU 103 makes the determination based on the information. In the present exemplary embodiment, examples of the specific cause include the occurrence of an error in WEC communication (cause 1), and that the communication apparatus 151 does not support the encryption method used for the connection between the information processing apparatus 101 and the AP (cause 2). Examples also include that the encryption method used for the connection between the information processing apparatus 101 and the AP is not WEC-capable (cause 3). A connection failure due to cause 2 or 3 can occur if WEC is executed after the determination of YES in step S221 as will be described below. The reason is that if WEC is executed after the determination of YES in step S221, unlike a case where WEC is executed after step S215, the capability information about the communication apparatus 151 has not been obtained and the determinations of step S211 and S212 have not been made. If the determination is YES (YES in step S218), the processing proceeds to step S224. If the determination is NO (NO in step S218), the processing ends.

The processing of steps S217 and S218 may be omitted. Specifically, after step S216, the processing may be ended without performing step S217 or S218. If the determination of step S217 is NO (NO in step S217), the processing may be ended without performing step S218.

Next, step S219 to be performed if the determination of step S202 is NO or the determination of step S204 is NO will be described. In step S219, the CPU 103 determines whether the information processing apparatus 101 is connected to the AP by Wi-Fi when the setting operation is made. This determination is made based on whether the information about the AP is stored in the foregoing predetermined storage area. If the determination is YES (YES in step S219), the processing proceeds to step S220. If the determination is NO (NO in step S219), the processing ends.

Figure 3:
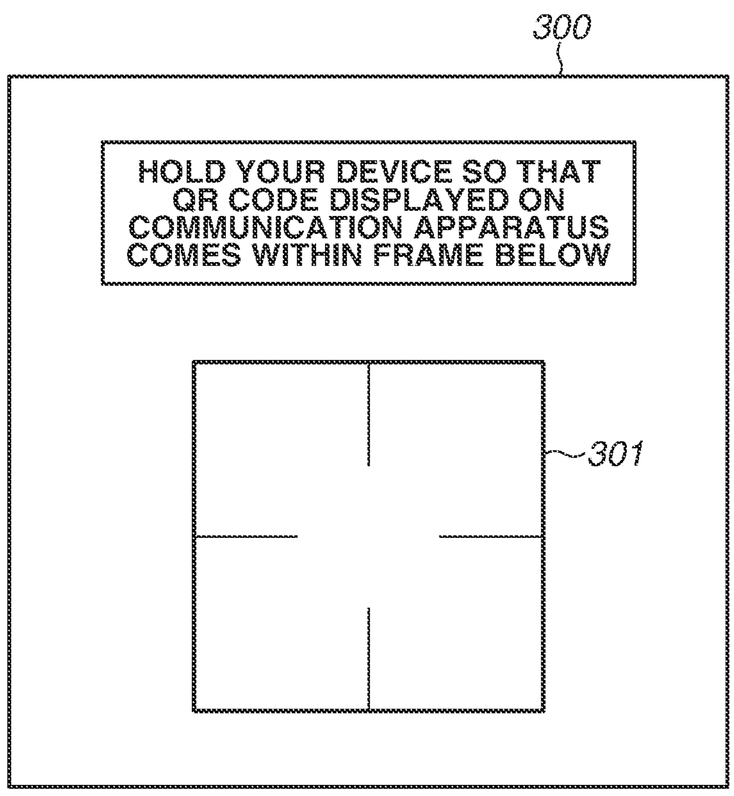
FIG. 3 illustrates an example of a screen for capturing a Quick Response (QR) code (registered trademark) displayed by a setting application.

In step S220, the CPU 103 attempts to obtain the WEC-related information by a method different from that for obtaining the WEC-related information in step S207. Specifically, for example, the CPU 103 attempts to obtain the WEC-related information by reading a QR code as described above. FIG. 3 illustrates an example of a screen for capturing a QR code, displayed by the setting application. A screen 300 for capturing a QR code displays a frame 301. The screen 300 further displays an image captured by the camera unit of the information processing apparatus 101. The user operates the information processing apparatus 101 so that a QR code displayed on the communication apparatus 151 is captured by the camera unit and falls within the frame 301. If the QR code is detected within the frame 301, the CPU 103 analyzes the QR code to obtain the WEC-related information. Note that the configuration for obtaining the WEC-related information is not limited thereto. For example, the WEC-related information may be obtained from the communication apparatus 151 by NFC or Bluetooth® Low Energy. If the communication apparatus 151 does not support WEC, the communication apparatus 151 is unable to display the QR code or transmit the WEC-related information by NFC or Bluetooth® Low Energy. In such a case, the CPU 103 ends the processing by accepting a cancel operation from the user on the setting application. The screen 300 for capturing a QR code may be displayed by an application program other than the setting application (for example, the WEC application or other imaging application programs).

In step S221, the CPU 103 determines whether the WEC-related information is successfully obtained in step S220.

If the determination is YES (YES in step S221), the processing proceeds to step S216. If the determination is NO (NO in step S221), the processing ends. If, for example, the QR code read in step S220 is not one for obtaining the WEC-related information or the reading of the QR code is failed, the determination is NO. Alternatively, if the determination is NO (NO in step S221), the processing may proceed to step S224 instead of ending. If the determination of step S221 is YES (YES in step S221), the CPU 103 may determine whether the encryption method used for the connection with the connected AP is a WEC-capable (DPP-capable) one. If the determination is YES, the processing may proceed to step S216. If the determination is NO, the processing may end or proceed to step S224. In such a case, which encryption method is WEC-capable shall be known to the CPU 103 from information stored in the setting application in advance.

Next, step S222 to be performed if the determination of step S209 is NO will be described. In step S222, the CPU 103 disconnects the Wi-Fi connection between the AP activated by the communication apparatus 151 operating in the network setup mode and the information processing apparatus 101.

In step S223, the CPU 103 reestablishes a connection between the AP to which the information processing apparatus 101 is connected by Wi-Fi when the setting operation is made and the information processing apparatus 101. The processing then proceeds to the foregoing step S220.

As described above, in the present exemplary embodiment, if the WEC-related information is unable to be obtained via the Wi-Fi connection between the communication apparatus 151 operating in the network setup mode and the information processing apparatus 101, the CPU 103 attempts to obtain the WEC-related information by another method. Specifically, for example, the CPU 103 attempts to obtain the WEC-related information by reading a QR code. WEC can thereby be executed even if the WEC-related information is unable to be obtained via the Wi-Fi connection between the communication apparatus 151 operating in the network setup mode and the information processing apparatus 101.

Next, step S224 to be performed in a case where the determination of step S206 is NO, the determination of step S208 is NO, the determination of step S211, S212, or S213 is NO, or the determination of step S218 is YES will be described. In step S224, the CPU 103 performs a network setup of the communication apparatus 151 by a method different from WEC. In the present exemplary embodiment, the method different from WEC refers to a method for performing a network setup of the communication apparatus 151 using the setup communication protocol different from the protocol for WEC (DPP). Details of this processing will be described in detail below with reference to FIG. 6. The processing then ends.

The content of the processing of the flowchart described above is not limited to the foregoing. For example, if the WEC-related information is unable to be obtained via the Wi-Fi connection between the communication apparatus 151 operating in the network setup mode and the information processing apparatus 101, the CPU 103 may end the processing without attempting to obtain the WEC-related information by other methods. Specific examples of the case where the WEC-related information is unable to be obtained via the Wi-Fi connection between the communication apparatus 151 operating in the network setup mode and the information processing apparatus 101 include a case where the determination of step S202 is NO, where the determination of step S204 is NO, and where the determination of step S209 is NO. In other words, in a case where the determination of step S202 is NO, the determination of step S204 is NO, or the determination of step S209 is NO, the processing may be ended with the subsequent processing (steps S220 and S221) being performed.

In the foregoing description, step S207 is followed by two determinations in steps S208 and S209. However, this is not restrictive. For example, after step S207, whether the WEC-related information is obtained may be determined instead of the two determinations in steps S208 and S209. If the determination is YES, the processing may proceed to step S210. If the determination is NO, the processing may proceed to step S224 to omit the processing of steps S220 to S223.

In the present exemplary embodiment, the encryption methods supported by the communication apparatus 151 include the WEC-capable ones. The determination in step S211 may therefore be omitted. Specifically, for example, step S210 may be followed by the determination in step S212 without the determination in step S211.

Alternatively, the WEC-capable encryption methods may rather include an encryption method or methods supported by the communication apparatus 151, like when WPA3 is the only encryption method supported by the communication apparatus 151 while the WEC-capable encryption methods are WPA2 and WPA3. In such a case, the determination in step S212 may be omitted. Specifically, after the determination of YES in step S211, the processing of step S213 may be performed without making a determination in step S212.

Figure 4:
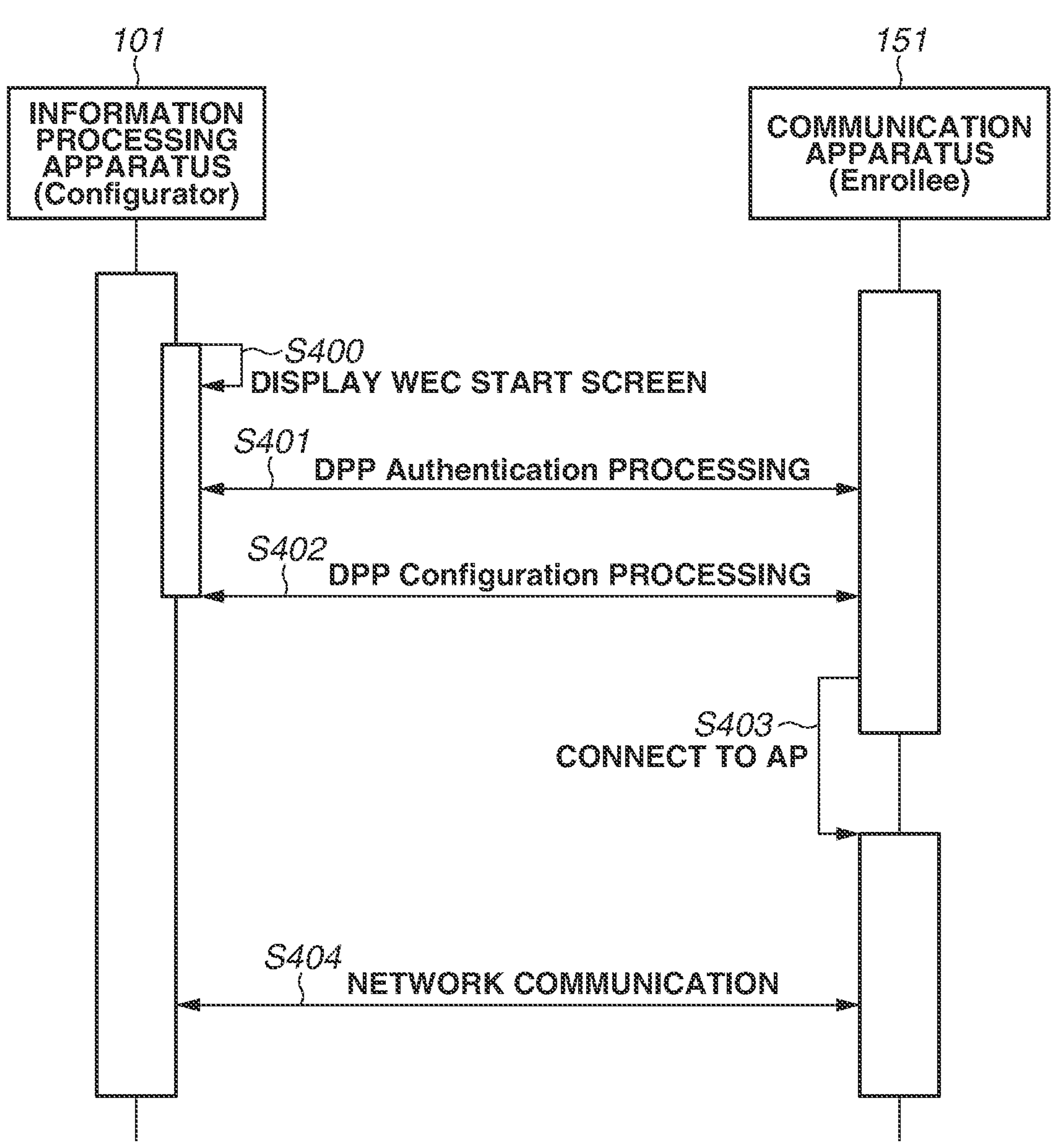
FIG. 4 is a sequence diagram illustrating processing performed by the information processing apparatus and the communication apparatus.

The processing performed by the information processing apparatus 101 and the communication apparatus 151 in step S216 will be described with reference to FIG. 4. The sequence illustrated in FIG. 4 is implemented, for example, by the CPUs of the respective apparatuses reading programs stored in the ROMs or external storage devices of the apparatuses into the RAMs of the apparatuses and executing the programs.

In step S400, the information processing apparatus 101 starts WEC using the DPP by an OS function. Specifically, the information processing apparatus 101 activates the WEC application by instructing the OS to activate the WEC application via the setting application. This runs the WEC application in the foreground, and the setting application in the background. The execution of this instruction corresponds to an instruction to execute WEC, for example.

Figure 5:
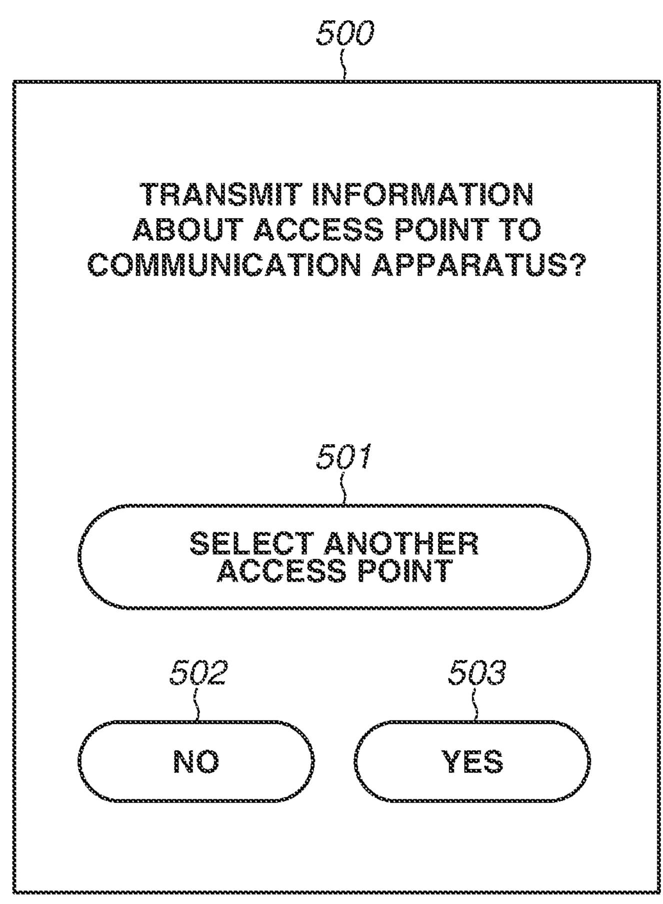
FIG. 5 illustrates an example of a Wireless Fidelity (Wi-Fi) Easy Connect (WEC) start screen.

The information processing apparatus 101 thereby displays a WEC start screen of the WEC application. The WEC application is a program preinstalled on the information processing apparatus 101 and provided by the OS vendor of the information processing apparatus 101. If the WEC application is activated, the WEC-related information obtained by the setting application is provided for the WEC application. FIG. 5 illustrates an example of the WEC start screen displayed by the WEC application. The WEC start screen 500 displays areas 501, 502, and 503.

The area 501 is an area for changing the AP that is set as a target to be set by WEC. Before the area 501 is operated, the AP set as the target to be set by WEC is the AP to which the information processing apparatus 101 is currently connected. If the area 501 is selected, the information processing apparatus 101 displays an AP list, and sets an AP selected from the list by the user as a new target to be set by WEC. For example, the AP list include APs found by an AP search by the information processing apparatus 101, and APs to which the information processing apparatus 101 has been connected before. The area 502 is an area for cancelling the execution of WEC. The area 503 is an area for issuing an instruction to execute WEC. If the area 502 is operated, the information processing apparatus 101 ends the processing of the sequence diagram, and the processing proceeds to step S217. In such a case, WEC is regarded as failed.

If the area 503 is pressed, the information processing apparatus 101 proceeds to step S401.

In step S401, the WEC application executes the WEC API using the WEC-related information and the information about the AP set as the target to be set by WEC, whereby the OS is instructed to execute WEC. Processing called DPP Authentication is performed between the information processing apparatus 101 and the communication apparatus 151 by an OS function. In the DPP Authentication processing, the information processing apparatus 101 and the communication apparatus 151 communicate authentication information and information for use in information encryption therebetween, whereby the communication between the apparatuses is authenticated. Various types of information transmitted from the information processing apparatus 101 in the communication in the DPP Authentication processing are encrypted based on the WEC-related information obtained by the information processing apparatus 101 in the processing illustrated in FIG. 2. Specifically, in the DPP Authentication processing, the information processing apparatus 101 initially transmits an Authentication Request as a request for the network setup using the DPP. Next, the communication apparatus 151 operating in the DPP standby mode, which is a mode to wait for an Authentication Request, receives the Authentication Request transmitted from the information processing apparatus 101. Receiving the Authentication Request, the communication apparatus 151 attempts to decrypt the received Authentication Request using the decryption key the communication apparatus 151 currently has.

If the decryption is successful, the communication apparatus 151 transmits an Authentication Response to the information processing apparatus 101 to authenticate the communication with the information processing apparatus 101. If the information processing apparatus 101 has failed in obtaining the correct WEC-related information and failed in correctly encrypting information, the decryption by the communication apparatus 151 fails. In such a case, the authentication is failed and the Authentication Response is not transmitted. The DPP Authentication processing is completed by the information processing apparatus 101 receiving the Authentication Response. In the DPP Authentication processing, the communication is performed using the DPP.

In step S402, processing called DPP Configuration is performed between the information processing apparatus 101 and the communication apparatus 151 by an OS function. In the DPP Configuration processing, the information processing apparatus 101 transmits connection information for connecting to the AP set as the target to be set by WEC to the communication apparatus 151 by WEC. The connection information includes at least one or more pieces of information indicating the SSID, password, and encryption method of the AP set as the target to be set by WEC. The password transmitted here is information input by the user on a screen displayed by an application supported by the OS in establishing the connection between the information processing apparatus 101 and the AP. The OS stores the information when the connection between the information processing apparatus 101 and the AP is established. The password is information not stored in the setting application. The password transmitted here does not need to be newly input by the user on the screen displayed by the setting application since the password is information already stored by the OS and the DPP Configuration processing is processing performed by the OS. By transmitting the connection information by WEC as in the present exemplary embodiment, the password can be transmitted to the communication apparatus 151 by secure communication without accepting the input of a new password by the user on the screen displayed by the setting application. Again, in the DPP Configuration processing, the communication is performed using the DPP.

In step S403, the communication apparatus 151 ends the network setup mode, and enters the infrastructure mode. The communication apparatus 151 then attempts to connect to the AP corresponding to the connection information obtained by WEC, using the connection information. If the connection is successful, the communication apparatus 151 can thereafter communicate via the network formed by the AP connected. The communication via the network formed by the AP connected is performed using a protocol different from the DPP (specific examples include Port 9100, SNMP, and a protocol specific to the vendor of the communication apparatus 151). The communication apparatus 151 may transmit information indicating the success or failure of the connection to the AP corresponding to the connection information obtained by WEC to the information processing apparatus 101. If the connection to the AP corresponding to the connection information obtained by WEC is failed, the communication apparatus 151 may transmit information indicating the cause of the failure to the information processing apparatus 101. Such information may be transmitted using the DPP. Examples of the cause of the failure in connecting to the AP corresponding to the connection information obtained by WEC include an error in WEC communication, that the AP is not found, and that the WEC-related information obtained from the communication apparatus 151 is not appropriate information. Other examples include that the encryption method used for the connection with the AP set as the target to be set by WEC is one not supported by the communication apparatus 151. Other examples also include that the encryption method used for the connection with the AP set as the target to be set by WEC is not a WEC-capable one. The information processing apparatus 101 may display the information indicating the success or failure of the connection between the AP corresponding to the connection information obtained by WEC and the communication apparatus 151 on the display unit 108. If the connection between the AP corresponding to the connection information obtained by WEC and the communication apparatus 151 is failed, the information processing apparatus 101 may further display the information indicating the cause of the failure on the display unit 108. In the present exemplary embodiment, the destination of the notification about the connection with the AP is switched based on an operation start condition in the network setup mode before the connection to the AP is attempted in step S403 using the connection information obtained by WEC. This will be described below with reference to FIGS. 10 and 11.

In step S404, the information processing apparatus 101 switches the application running in the foreground from the WEC application to the setting application based on the completion of the execution of WEC. The information processing apparatus 101 then searches the network to which the information processing apparatus 101 belongs for the communication apparatus 151. This processing is implemented by the setting application notified of the completion of the execution of WEC by the OS. If the communication apparatus 151 is found, the information processing apparatus 101 requests the capability information from the communication apparatus 151. The communication apparatus 151 transmits the capability information to the information processing apparatus 101. The capability information about the communication apparatus 151 is thereby registered in the setting application, and the information processing apparatus 101 can thereafter communicate with the communication apparatus 151 using the setting application. Specifically, for example, the information processing apparatus 101 can transmit a print job to the communication apparatus 151 using the setting application. If the information processing apparatus 101 here belongs to the network formed by the AP to which the communication apparatus 151 is connected by WEC, the information processing apparatus 101 can communicate with the communication apparatus 151 via the AP. If the information processing apparatus 101 and the communication apparatus 151 are unable to communicate, like in a case where the AP to which the communication apparatus 151 is connected is not the one to which the information processing apparatus 101 is connected, the request for and acquisition of the capability information are omitted. The communication in step S404 is performed, for example, using a communication protocol different from the DPP or the setup communication protocol. The information processing apparatus 101 then ends the processing of this sequence diagram. The processing proceeds to step S217.

In the foregoing description, the WEC application is described to display the WEC start screen, and execute the WEC API and thereby instruct the OS to execute WEC. However, such a configuration is not restrictive. For example, the WEC start screen may be displayed by the setting application. Moreover, the setting application may execute the WEC API and thereby instruct the OS to execute WEC.

Figure 6:
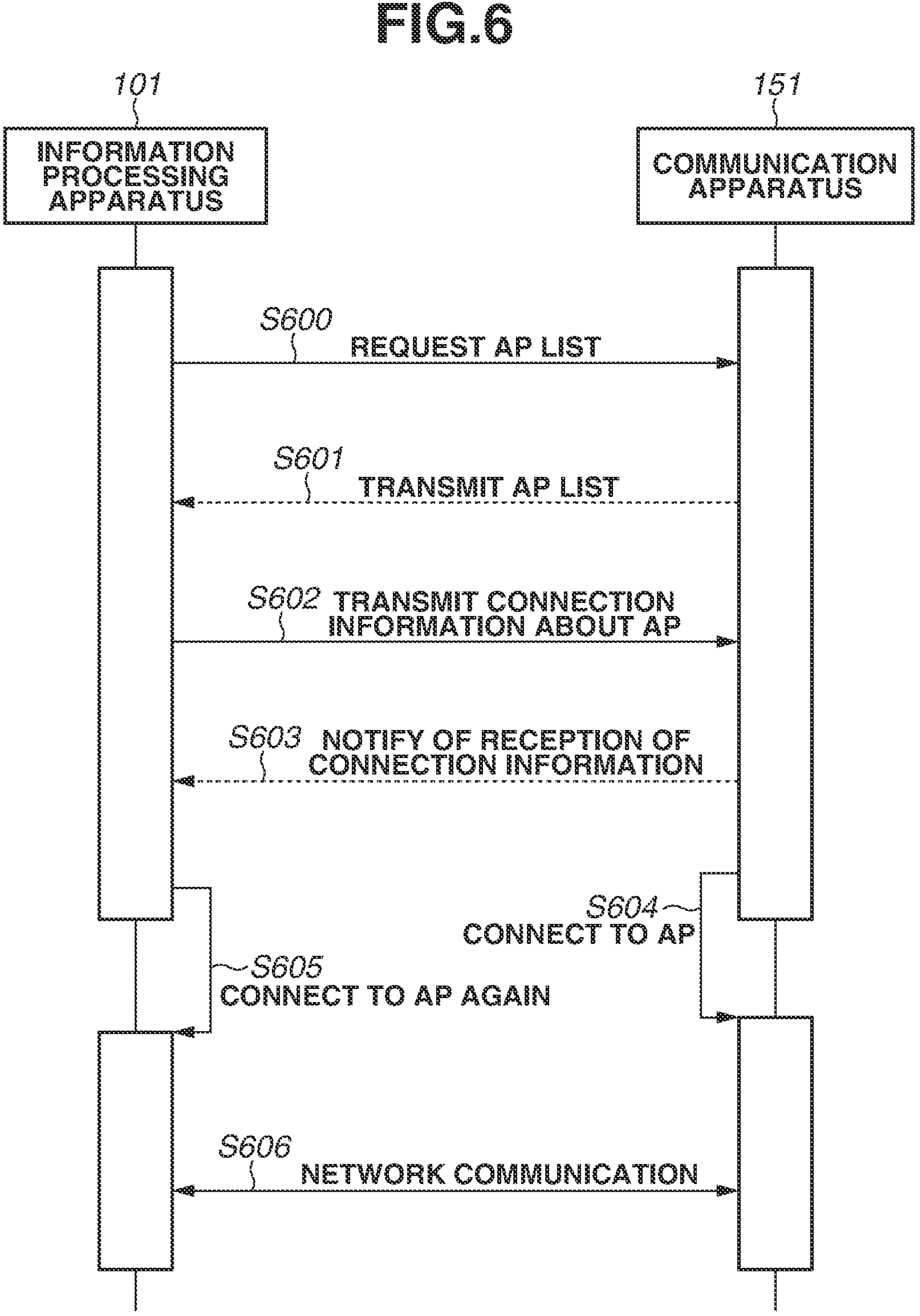
FIG. 6 is a sequence diagram illustrating processing performed by the information processing apparatus and the communication apparatus.

Next, the processing performed by the information processing apparatus 101 and the communication apparatus 151 in step S224 will be described with reference to FIG. 6. The sequence illustrated in FIG. 6 is implemented, for example, by the CPUs of the respective apparatuses reading programs stored in the ROMs or external storage devices of the apparatuses into the RAMs of the apparatuses and executing the programs. As described above, the communication via the Wi-Fi connection between the communication apparatus 151 operating in the network setup mode and the information processing apparatus 101 uses the setup communication protocol.

In step S600, the information processing apparatus 101 requests an AP list from the communication apparatus 151 via the Wi-Fi connection between the communication apparatus 151 operating in the network setup mode and the information processing apparatus 101, using the setting application.

In step S601, the communication apparatus 151 transmits the AP list to the information processing apparatus 101 via the Wi-Fi connection between the communication apparatus 151 operating in the network setup mode and the information processing apparatus 101. The AP list transmitted here is a list indicating one or a plurality of APs that is found by the communication apparatus 151 performing an AP search and to which the communication apparatus 151 can be connected.

In step S602, the information processing apparatus 101 transmits connection information about one of the APs included in the received list to the communication apparatus 151 via the Wi-Fi connection between the communication apparatus 151 operating in the network setup mode and the information processing apparatus 101.

This processing is implemented by the setting application controlling the information processing apparatus 101 to transmit the connection information about one of the APs included in the received list. Specifically, in this processing, if the received list includes the connected AP, the information processing apparatus 101 transmits the connection information about the connected AP. In the present exemplary embodiment, the list includes only APs to which the communication apparatus 151 can connect. The case where the received list includes the connected AP therefore refers to a case where the communication apparatus 151 can connect to the connected AP. If the received list does not include the connected AP, the information processing apparatus 101 displays the received list on the display unit 108, and accepts the user's selection of one of the APs from the list. The information processing apparatus 101 then transmits the connection information about the selected AP. In the present exemplary embodiment, the list includes only the APs to which the communication apparatus 151 can connect. The case where the received list does not include the connected AP therefore refers to a case where the communication apparatus 151 is unable to connect to the connected AP. The communication apparatus 151 is unable to connect to APs that are connectable using an encryption method not supported by the communication apparatus 151, and such APs are excluded from the list. The communication apparatus 151 is unable to connect to APs that are connectable in a frequency band not supported by the communication apparatus 151, either, and such APs are also excluded from the list. In step S224, which is performed if the determination of step S211 is NO or the determination of step S213 is NO, connection information about an AP different from the connected AP is thus transmitted to the communication apparatus 151. If the determination of step S212 is NO, either the connection information about the connected AP or the connection information about an AP different from the connected AP can be transmitted since the communication apparatus 151 may be able to connect to the connected AP. Such a configuration is not restrictive, and the list may be displayed to accept the selection of an AP from the user each time. Before transmitting the connection information, the information processing apparatus 101 accepts the input of a password for connecting to the AP from the user on a screen displayed by the setting application. The information processing apparatus 101 then includes the accepted password into the connection information and transmits the connection information.

In step S603, the communication apparatus 151 notifies the information processing apparatus 101 of the reception of the connection information via the Wi-Fi connection between the communication apparatus 151 operating in the network setup mode and the information processing apparatus 101.

In step S604, the communication apparatus 151 ends the network setup mode, and enters the infrastructure mode. The communication apparatus 151 then attempts to connect to the AP corresponding to the connection information obtained in step S602, using the connection information. If the connection is successful, the communication apparatus 151 can thereafter communicate via the network formed by the AP connected.

In step S605, the information processing apparatus 101 connects again to the AP to which the information processing apparatus 101 is connected when the setting operation is made, using the setting application and the stored connection information. Note that such a configuration is not restrictive. For example, if connection information about an AP different from the AP to which the information processing apparatus 101 is connected by Wi-Fi when the setting operation is made is transmitted to the communication apparatus 151, the information processing apparatus 101 may connect to the different AP.

In step S606, the information processing apparatus 101 searches the network to which the information processing apparatus 101 belongs for the communication apparatus 151 using the setting application. If the communication apparatus 151 is found, the information processing apparatus 101 requests the capability information from the communication apparatus 151. The communication apparatus 151 transmits the capability information to the information processing apparatus 101. The capability information about the communication apparatus 151 is thereby registered in the setting application, and the information processing apparatus 101 can thereafter communicate with the communication apparatus 151 using the setting application. Specifically, for example, the information processing apparatus 101 can transmit a print job to the communication apparatus 151 using the setting application. If the information processing apparatus 101 here belongs to the network formed by the AP to which the communication apparatus 151 is connected by the network setup, the information processing apparatus 101 can communicate with the communication apparatus 151 via the AP. If the information processing apparatus 101 and the communication apparatus 151 are unable to communicate, like when the AP to which the communication apparatus 151 is connected is not the one to which the information processing apparatus 101 is connected, the request and acquisition of the capability information are omitted. The communication in step S606 is performed, for example, using a communication protocol different from the DPP or the setup communication protocol (specific examples include Canon Hypertext Transfer Protocol [HTTP] Management Protocol [CHMP]). The information processing apparatus 101 then ends the processing illustrated in this sequence diagram.

In step S602, the information processing apparatus 101 may transmit a connection request for establishing a direct connection with the communication apparatus 151 to the communication apparatus 151 via the Wi-Fi connection between the communication apparatus 151 operating in the network setup mode and the information processing apparatus 101. In such a case, instead of the processing of the foregoing steps S603 to S605, the communication apparatus 151 transmits connection information about the AP to be activated in the communication apparatus 151 in the P2P mode to the information processing apparatus 101, ends the network setup mode, and enters the P2P mode.

The information processing apparatus 101 then establishes a P2P connection with the communication apparatus 151 using the received connection information. The processing of step S606 is then performed. Here, the network to which the information processing apparatus 101 belongs refers to the network formed by the AP activated in the communication apparatus 151.

The content of the processing illustrated in the sequence diagram described above is not limited to the foregoing. For example, if the received list does not include the AP to which the information processing apparatus 101 is connected by Wi-Fi when the setting operation is made, the connection information about the AP does not need to be transmitted. In other words, the information processing apparatus 101 does not need to attempt to establish a connection between the communication apparatus 151 and the AP. Instead, the information processing apparatus 101 may receive the connection information about the AP to be activated in the communication apparatus 151 in the P2P mode from the communication apparatus 151, and attempt to establish a connection between the communication apparatus 151 operating in the P2P mode and the information processing apparatus 101. In such a configuration, the communication apparatus 151 may transmit the connection information about the AP to be activated in the communication apparatus 151 in the P2P mode, and then end the network setup mode and enter the P2P mode. The P2P mode for the communication apparatus 151 to enter here may be the AP mode or a WFD mode.

Figure 7:
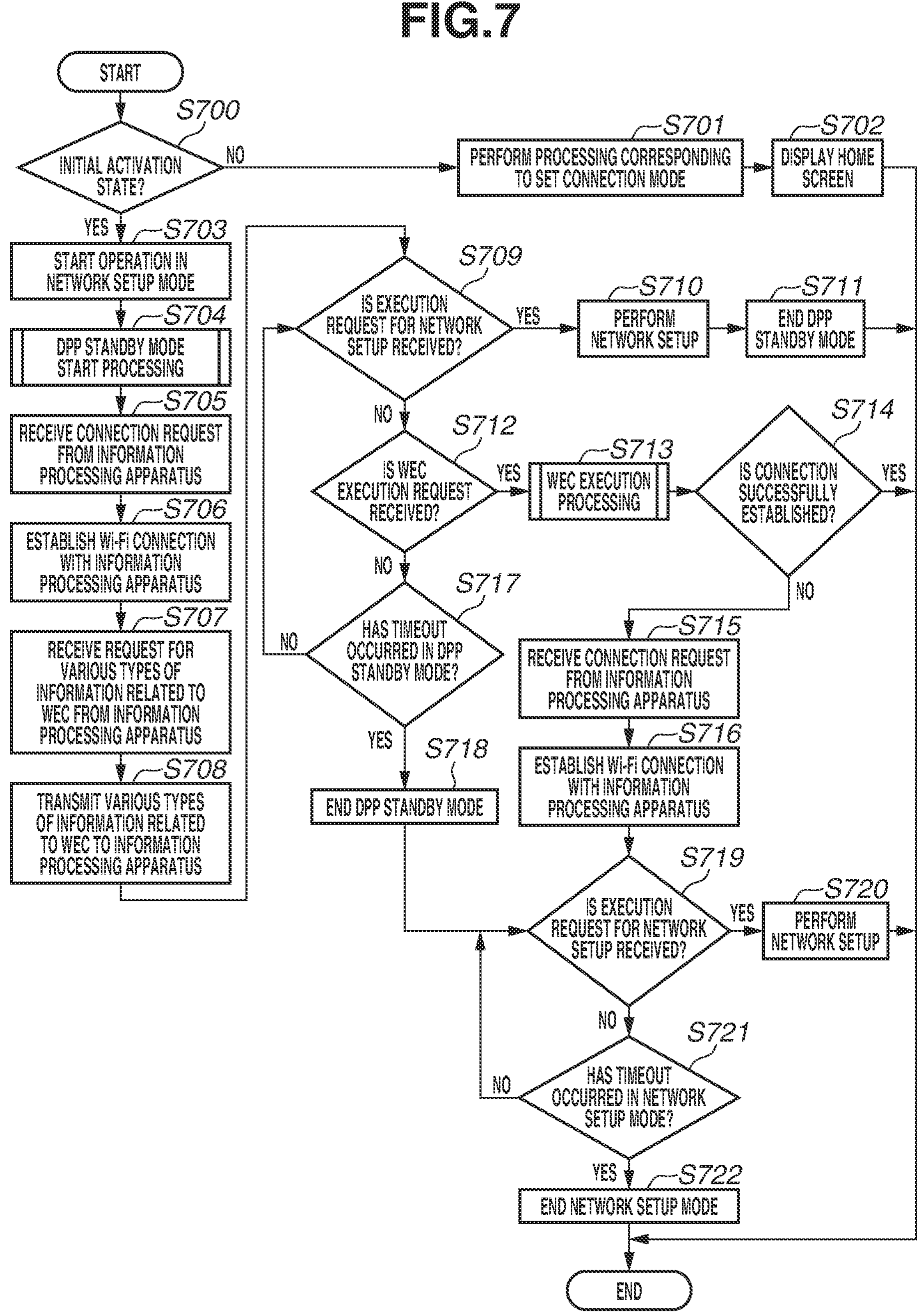
FIG. 7 is a flowchart illustrating a procedure for first setup processing the communication apparatus performs in the network setup processing.
Figure 8:
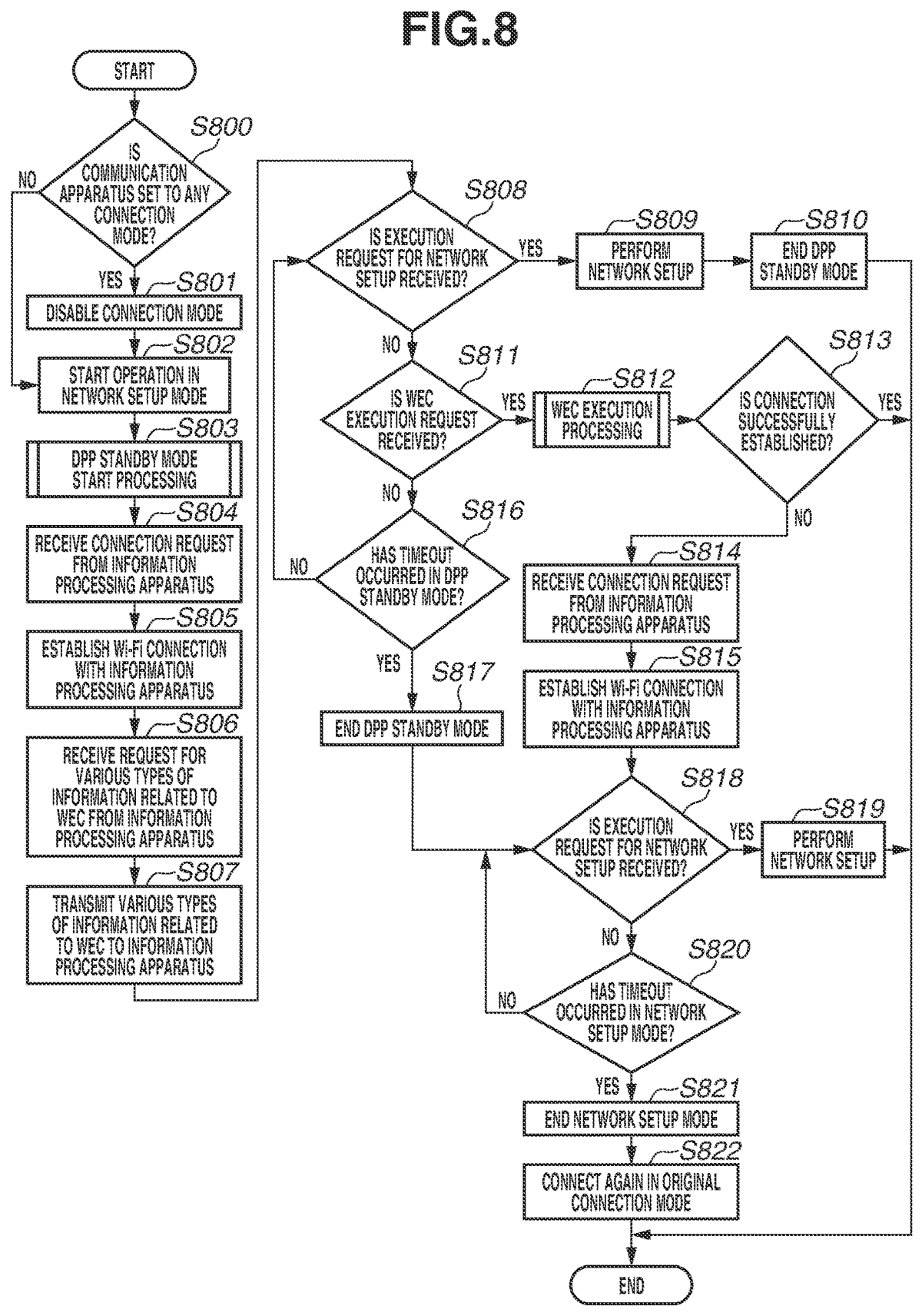

FIGS. 7 and 8 are flowcharts illustrating processing procedures the communication apparatus 151 performs in the network setup processing according to the present exemplary embodiment. In the present exemplary embodiment, the conditions for the communication apparatus 151 to start operation in the network setup mode and operation in the DPP standby mode include a first condition, a second condition, and a third condition. The first condition is that "a power-on operation be made on the communication apparatus 151 in a state where initialization is not completed, and the communication apparatus 151 be powered on". The second condition is that "a predetermined operation for a network setup be made on the communication apparatus 151 in a power-on state". The third condition is that "the user make an operation for simultaneously initializing a plurality of settings of the communication apparatus 151 on the display unit 161 of the communication apparatus 151, thereby changing a state where the connection mode of the communication apparatus 151 is set into a state where the connection mode of the communication apparatus 151 is not set". The plurality of settings of the communication apparatus 151 includes communication settings, print setting, and a power saving setting. The power-on operation here refers to an operation made on a power button disposed on the casing of the communication apparatus 151 to change a state where only a part of the communication apparatus 151 (for example, the CPU 154) is powered up into a state where the entire communication apparatus 151 is powered up. The communication apparatus 151 may be configured so that the start conditions include at least either one of the first and third conditions. More specifically, both the first and third conditions may be included. Either one of the first and third conditions may be included. The first condition is not limited to the foregoing, and may be, for example, that "a power-on operation be made on the communication apparatus 151 in a network initial state where network settings have respective initial values, and the communication apparatus 151 be powered on". The network initial state refers to a state where no connection mode is set.

Processing in the setup mode started based on the first condition and processing in the setup mode started based on the third condition will be described with reference to FIG. 7. Processing in the setup mode started based on the second condition will be described with reference FIG. 8.

First, the processing in the setup mode started based on the first condition and the third condition will be described. The communication apparatus 151 performs initialization based on execution of the power-on operation by the user for the first time (i.e., first condition) in a factory shipment state (delivery state). The factory shipment state corresponds to, for example, a state where the initialization of the communication apparatus 151 is not completed. For example, the communication apparatus 151 is shipped from the factory without an ink tank or a print head attached. For initialization, the communication apparatus 151 therefore performs processing for making the communication apparatus 151 usable. Examples include processing for prompting the user to attach the included ink tank or print head to the communication apparatus 151, page adjustment processing, and print head cleaning processing. Whether the communication apparatus 151 is in the factory shipment state is controlled by using a flag (initial activation flag) stored in the ROM 152 or the memory. The communication apparatus 151 is configured to change the state of the initial activation flag based on the completion of the initialization, so that the initialization will not be performed upon power-on of the communication apparatus 151 after the completion of the initialization.

To use the communication apparatus 151, the network setup of the communication apparatus 151 is desirably performed. In the present exemplary embodiment, the network setup processing is thus performed during the initialization. If the user makes an operation for simultaneously initializing the plurality of settings including the communication settings and print settings of the communication apparatus 151 on the display unit 161 of the communication apparatus 151, the communication apparatus 151 changes the connection mode to its initial value. Here, the initial value is a value indicating that no connection mode is set. In other words, the condition that the state where the connection mode of the communication apparatus 151 is set is changed into the state (network initial state) where the connection mode of the communication apparatus 151 is not set (i.e., third condition) is thereby satisfied. In the present exemplary embodiment, the network setup processing is performed during the initialization since the network setup of the communication apparatus 151 is desirably performed to use the communication apparatus 151.

FIG. 7 is a flowchart illustrating the processing the communication apparatus 151 performs when the power-on operation is made on the communication apparatus 151 or when the operation for simultaneously initializing the settings of the communication apparatus 151 is made. The flowchart illustrated in FIG. 7 is implemented, for example, by the CPU 154 reading the setting application stored in the ROM 152 or the memory into the RAM 153 and executing the setting application. The flowchart illustrated in FIG. 7 is started based on the execution of the foregoing power-on operation or the execution of the operation for simultaneously initializing the settings of the communication apparatus 151.

If the flowchart is started based on the power-on operation on the communication apparatus 151, then in step S700, the CPU 154 refers to the initial activation flag stored in the ROM 152 or the memory, and determines whether the communication apparatus 151 is in an initial activation state. For example, the initial activation flag is set to a specific value indicating the initial activation state at factory shipment of the communication apparatus 151. If the first condition is that "a power-on operation be made on the communication apparatus 151 in the network initial state, and the communication apparatus 151 be powered on", then in step S700, the CPU 154 may determine whether the communication apparatus 151 is in the initial network state. If the determination of step S700 is NO (NO in step S700), the processing proceeds to step S701. If the determination of step S700 is YES (YES in step S700), the processing proceeds to step S703. The case where the determination of step S700 is YES corresponds to a case where the first condition is satisfied. The case where the determination of step S700 is NO corresponds to a case where the initialization of the communication apparatus 151 has been completed and the communication apparatus 151 is powered on. If the flowchart is started based on the execution of the operation for simultaneously initializing the settings of the communication apparatus 151, the processing of step S700 is not performed and the processing of the flowchart starts at step S703.

In step S701, the CPU 154 performs processing corresponding to the set connection mode stored in the ROM 152 or the memory. For example, if the communication apparatus 151 is wirelessly connected to an AP by Wi-Fi and set to the infrastructure mode upon power-off by the user, the CPU 154 connects to the AP.

In step S702, the CPU 154 displays a standby screen (home screen). The processing of this flowchart ends. The display of the home screen may be omitted.

In step S703, which is performed if the determination of step S700 is YES, the CPU 154 causes the communication apparatus 151 to start operation in the network setup mode. Specifically, the CPU 154 activates the setup AP. To end the network setup mode after a lapse of a predetermined time, the CPU 154 further activates a timeout timer for the network setup mode and counts the elapsed time from the start of operation in the network setup mode.

In step S704, the CPU 154 causes the communication apparatus 151 to start operation in the DPP standby mode (DPP standby mode start processing). The DPP standby mode will be described below with reference to FIG. 9. The CPU 154 activates a timeout timer for the DPP standby mode and counts the elapsed time from the start of operation in the DPP standby mode.

In step S705, the CPU 154 receives a connection request for the setup AP from the information processing apparatus 101.

In step S706, the CPU 154 attempts to establish a Wi-Fi connection with the information processing apparatus 101. This Wi-Fi connection corresponds to the Wi-Fi connection between the communication apparatus 151 operating in the network setup mode and the information processing apparatus 101.

In step S707, the CPU 154 receives a request for various types of information related to WEC from the information processing apparatus 101 via the Wi-Fi connection established in step S706. As described above, the communication via the Wi-Fi connection between the AP activated in the communication apparatus 151 operating in the network setup mode and the information processing apparatus 101 uses the setup communication protocol.

In step S708, the CPU 154 transmits various types of information about the communication apparatus 151 related to WEC to the information processing apparatus 101. Examples of the various types of information about the communication apparatus 151 related to WEC include the foregoing WEC-related information and information indicating whether the communication apparatus 151 supports WEC. The information indicating whether the communication apparatus 151 supports WEC is information indicating whether the communication apparatus 151 supports the DPP. If the communication apparatus 151 does not support WEC, information indicating that the communication apparatus 151 does not support WEC is transmitted without WEC-related information. If the communication apparatus 151 does not support WEC, both WEC-related information and the information indicating whether the communication apparatus 151 supports WEC do not need to be transmitted.

In step S709, the CPU 154 determines whether an execution request for a network setup using the setup communication protocol is received. Specifically, the CPU 154 determines whether a request for an AP list is received from the information processing apparatus 101. If the determination of step S709 is YES (YES in step S709), the processing proceeds to step S710. If the determination of step S709 is NO (NO in step S709), the processing proceeds to step S712.

In step S710, the CPU 154 performs the network setup using the setup communication protocol. Specifically, the CPU 154 performs the processing described to be performed by the communication apparatus 151 in the processing described with reference to FIG. 6. In step S604 of FIG. 6, the CPU 154 ends the operation in the network setup mode, and deactivates the setup AP.

In step S711, the CPU 154 ends the DPP standby mode. The processing of this flowchart ends. Either the operation in the network setup mode or the DPP standby mode may be ended first after the network setup is performed. More specifically, the CPU 154 may end the operation in the DPP standby mode before ending the operation in the network setup mode. The CPU 154 may end the operation in the network setup mode and the DPP standby mode at the same time. The CPU 154 may end the operation in the DPP standby mode and the operation in the network setup mode based on the connection of the communication apparatus 151 to the AP.

In step S712, which is performed if the determination of step S709 is NO, the CPU 154 determines whether an execution request for the network setup using the DPP (WEC execution request) is received. Specifically, the CPU 154 determines whether an Authentication Request is received from the information processing apparatus 101 as an execution request for the network setup using the DPP in the foregoing DPP Authentication processing. If the determination of step S712 is YES (YES in step S712), the processing proceeds to step S713. If the determination of step S712 is NO (NO in step S712), the processing proceeds to step S717. The CPU 154 may activate a timeout timer for waiting for the execution request for the network setup using the DPP. In such a case, the channel used for the DPP communication may be changed if the count value of the timeout timer for waiting for the WEC execution request exceeds a threshold.

If the CPU 154 has changed the channel used for the DPP communication a predetermined number of times or more and still fails to receive the execution request for the network setup using the DPP, the processing may proceed to step S718 to end the DPP standby mode. The CPU 154 then may wait for an execution request for the network setup mode.

In step S713, the CPU 154 performs the network setup using the DPP (WEC execution processing). Specifically, the CPU 154 performs the processing described to be performed by the communication apparatus 151 in the processing described with reference to FIG. 4. The network setup using the DPP (WEC) will be described below with reference to FIG. 10.

In step S714, the CPU 154 determines whether the connection between the AP to which the information processing apparatus 101 is connected and the communication apparatus 151 is successfully established by WEC executed. If the connection between the communication apparatus 151 and the information processing apparatus 101 is successful, i.e., the communication apparatus 151 is connected to the AP to which the information processing apparatus 101 is connected, the establishment of the connection is determined to be successful. If, in step S713, any one of the determinations of steps S1002, S1004, S1006, S1007, and S1008 in FIG. 10 is NO and the communication apparatus 151 performs processing for ending the DPP standby mode in step S1003 without being connected to the AP to which the information processing apparatus 101 is connected, the establishment of the connection is determined to be failed. Moreover, if the communication apparatus 151 is connected to an AP in step S1013 but the AP is different from the one to which the information processing apparatus 101 is connected, the establishment of the connection is determined to be failed. Note that the establishment of the connection may be determined to be successful even in a case where the communication apparatus 151 is connected to an AP and the AP is different from the one to which the information processing apparatus 101 is connected. If the determination of step S714 is YES (YES in step S714), the processing of this flowchart ends. If the determination of step S714 is NO (NO in step S714), the processing proceeds to step S715. Note that if, in step S713, all the determinations of steps S1002, S1004, S1006, S1007, and S1008 in FIG. 10 are YES, the CPU 154 may determine that WEC is successful, and connect to the AP before ending the DPP standby mode and the network setup mode. That is, the processing order is not limited in particular. The CPU 154 then reestablishes the connection between the communication apparatus 151 and the information processing apparatus 101, and then in step S720, performs a network setup using the setup communication protocol. In other words, if the connection between the AP and the communication apparatus 151 fails to be established by WEC executed, a network setup using the setup communication protocol is performed. The connection between the AP and the communication apparatus 151 can thereby be established with higher reliability. If, in step S713, none of the determinations in FIG. 10 is NO and the communication apparatus 151 still fails to connect to the AP in step S1013, the determination of step S714 is NO. In such a case, since the network setup mode is ended in step S1010, the CPU 154 starts the network setup mode again to perform a network setup using the setup communication protocol. If the connection between the AP and the communication apparatus 151 fails to be established by WEC, the network setup mode may be ended without performing a network setup.

The processing of steps S715 and S716 is similar to that of steps S705 and S706, respectively. A description thereof will thus be omitted.

In step S717, the CPU 154 determines whether the count value of the timeout timer for the DPP standby mode exceeds a threshold and a timeout has occurred in the DPP standby mode. If the determination of step S717 is YES (YES in step S717), the processing proceeds to step S718. If the determination of step S717 is NO (NO in step S717), the processing returns to step S709.

In step S718, the CPU 154 ends the DPP standby mode. The processing proceeds to step S719.

The processing of steps S719 and S720 is similar to that of steps S709 and S710, respectively. A description thereof will thus be omitted. If the determination of step S719 is YES (YES in step S719), the processing proceeds to step S720. If the determination of step S719 is NO (NO in step S719), the processing proceeds to step S721.

In step S721, the CPU 154 determines whether the count value of the timeout timer for the network setup mode exceeds a threshold and a timeout has occurred in the network setup mode. If the determination of step S721 is YES (YES in step S721), the processing proceeds to step S722. If the determination of step S721 is NO (NO in step S721), the processing returns to step S719.

In step S722, the CPU 154 ends the operation in the network setup mode, and deactivates the setup AP. The reason is that the setup AP is an AP that does not need a password as described above, and a prolonged period of activation increases the possibility that a connection be requested by an inappropriate apparatus. Alternatively, the setup AP may be an AP that uses a password. In such a case, the password used in connecting to the setup AP is a fixed password (not modifiable by the user) known to the setting application in advance. The processing of this flowchart ends.

After the completion of the initialization, the CPU 154 changes the value of the initial activation flag stored in the ROM 152 or the memory from the value indicating the initial activation state to a value indicating a non-initial activation state. The non-initial activation state corresponds to a state where the initialization is completed. This prevents the flowchart of FIG. 7 from being performed if the initialization is completed and the communication apparatus 151 is powered on by the user from the next time on.

Next, the setup processing in the operation in the setup mode started based on the foregoing second condition will be described.

FIG. 8 is a flowchart illustrating the setup processing performed by the communication apparatus 151. The flowchart illustrated in FIG. 8 is implemented, for example, by the CPU 154 reading the setting application stored in the ROM 152 or the memory into the RAM 153 and executing the setting application. The flowchart of FIG. 8 is performed based on the satisfaction of the second condition.

In step S800, the communication apparatus 151 determines whether the communication apparatus 151 is set to any connection mode at least when a setting operation is made. If the determination of step S800 is YES (YES in step S800), the processing proceeds to step S801. If the determination of step S800 is NO (NO in step S800), the processing proceeds to step S802.

In step S801, the communication apparatus 151 disables the connection mode to which the communication apparatus 151 is set at least when the setting operation is made. Suppose, for example, that the communication apparatus 151 is set to the infrastructure mode at least when the setting operation is made, and the communication apparatus 151 is in wireless connection with an AP by Wi-Fi. In such a case, the communication apparatus 151 disables the infrastructure mode and disconnects the connection with the AP. The communication apparatus 151 also obtains information about the connection mode to which the communication apparatus 151 is set at least when the setting operation is made, and stores the information in the ROM 152 or the memory. The reason is that the information is used in step S822 to be described below in connecting again in the connection mode to which the communication apparatus 151 is set at least when the setting operation is made. For example, the communication apparatus 151 obtains the information about the AP to which the communication apparatus 151 is wirelessly connected by Wi-Fi at least when the setting operation is made, and stores the information in the ROM 152 or the memory. The information includes information for connecting to the AP to which the communication apparatus 151 is wirelessly connected by Wi-Fi (information indicating the SSID and the encryption method). If the communication apparatus 151 is not set to any connection mode when at least the setting operation is made, the acquisition of the information about the connection mode is omitted.

The processing of steps S802 to S821 is similar to that of steps S703 to S722, respectively. A description thereof will thus be omitted.

The WEC execution processing in step S812 will be described below with reference to FIG. 11.

In step S822, the communication apparatus 151 connects again in the connection mode to which the communication apparatus 151 is set at least when the setting operation is made, using the information about the connection mode to which the communication apparatus 151 is set at least when the set operation is made, obtained in step S801. For example, the communication apparatus 151 connects again to the AP to which the communication apparatus 151 is wirelessly connected by Wi-Fi at least when the setting operation is made. If WEC is successful in step S812 or the DPP standby mode is ended in step S810, the communication apparatus 151 may also connect again in the connection mode to which the communication apparatus 151 is set when the setting operation is made.

The processing of step S704 in FIG. 7 and step S803 in FIG. 8 will now be described with reference to FIG. 9.

Figure 9:
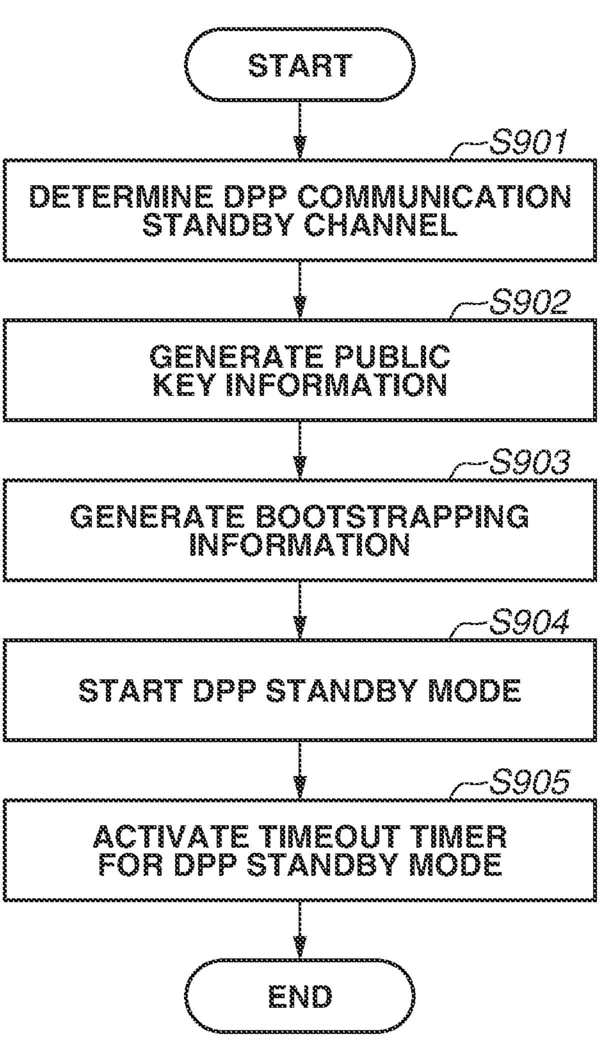
FIG. 9 is a flowchart illustrating Device Provisioning Protocol (DPP) standby mode start processing.

FIG. 9 is a flowchart illustrating details of the DPP standby mode start processing. The flowchart illustrated in FIG. 9 is implemented, for example, by the CPU 154 reading the setting application stored in the ROM 152 or the memory into the RAM 153 and executing the setting application. The flowchart illustrated in FIG. 9 is started based on the start of the network setup mode by the communication apparatus 151, for example. As described above, the network setup mode is started based on the satisfaction of the first, second, or third condition. The flowchart can thus be regarded as being started based on the satisfaction of the first, second, or third condition, for example.

In step S901, the CPU 154 determines a DPP communication standby channel. The DPP communication standby channel refers to a channel where the communication apparatus 151 waits for a network setup request transmitted from the information processing apparatus 101 using the DPP. The DPP Configuration processing uses the same channel. Which channel to use as the DPP communication standby channel may be set by the user operating the operation unit 159 of the communication apparatus 151, for example.

In step S902, the CPU 154 generates the foregoing public key information to be used for secure communication with the information processing apparatus 101.

In step S903, the CPU 154 generates the foregoing bootstrapping information. For example, the bootstrapping information includes identification information (MAC address) about the communication apparatus 151, information about the DPP communication standby channel, and the public key information generated in step S902.

In step S904, the CPU 154 starts the DPP standby mode. With the DPP standby mode started, the communication apparatus 151 and the information processing apparatus 101 can communicate in the DPP Authentication processing.

In step S905, the CPU 154 activates the timeout timer for the DPP standby mode. If a predetermined time elapses after the start of operation in the DPP standby mode, the CPU 154 ends the operation in the DPP standby mode. The purpose is to transition to the network setup processing using the setup communication protocol by ending the operation in the DPP standby mode. Specifically, if the count value of the timeout timer for the DPP standby mode exceeds the threshold and a timeout has occurred in the DPP standby mode in step S717 or S816, the CPU 154 ends the DPP standby mode.

Before performing step S901 of FIG. 9, the CPU 154 may determine whether the communication apparatus 151 has started the network setup mode. If the communication apparatus 151 has started the network setup mode, the processing may proceed to step S901. If the communication apparatus 151 has not started the network setup mode, the processing of this flowchart may be ended without starting the DPP standby mode.

The processing then proceeds to step S705 in FIG. 7 or step S804 in FIG. 8.

Now, the processing of step S713 in FIG. 7 and step S812 in FIG. 8 will be described with reference to FIGS. 10 and 11, respectively.

FIG. 10 is a flowchart illustrating the WEC execution processing in FIG. 7 (i.e., the processing of step S713 in FIG. 7) started based on the first or third condition, and corresponds to the operation of the communication apparatus 151 in the sequence of FIG. 4. The flowchart illustrated in FIG. 10 is implemented, for example, by the CPU 154 reading the setting application stored in the ROM 152 or the memory into the RAM 153 and executing the setting application. The flowchart of FIG. 10 is started based on the reception of a WEC execution request in the DPP Authentication processing from the information processing apparatus 101 by the communication apparatus 151.

In step S1001, the CPU 154 performs the DPP Authentication processing. As described above, in the DPP Authentication processing, the information processing apparatus 101 and the communication apparatus 151 authenticate communication therebetween by communicating the authentication information and the information used for information encryption therebetween. In the DPP Authentication processing, the communication is performed using the DPP.

In step S1002, the CPU 154 determines whether the DPP Authentication processing with the information processing apparatus 101 is successful. As described above, various types of information transmitted from the information processing apparatus 101 in the communication in the DPP Authentication processing are encrypted based on the WEC-related information obtained by the information processing apparatus 101 in the processing illustrated in FIG. 2. If the information received from the information processing apparatus 101 is successfully decrypted using the decryption key stored in advance, the CPU 154 authenticates the communication with the information processing apparatus 101. If the information processing apparatus 101 has failed in obtaining correct WEC-related information and failed in correctly encrypting the information, the decryption by the communication apparatus 151 fails and the authentication fails. If the communication with the information processing apparatus 101 is successfully authenticated, the CPU 154 therefore determines that the DPP Authentication processing is successful. If the authentication is failed, the CPU 154 determines that the DPP Authentication processing is failed. If the determination of step S1002 is NO (NO in step S1002), the processing proceeds to step S1003. In step S1003, the CPU 154 ends the DPP standby mode. The processing of this flowchart ends. On the other hand, if the determination of step S1002 is YES (YES in step S1002), the processing proceeds to step S1004.

In step S1004, the CPU 154 performs the DPP Configuration processing. In the DPP Configuration processing, the CPU 154 receives connection information for connecting to the AP set as the target to be set by WEC from the information processing apparatus 101 by WEC. The connection information includes information indicating the SSID, password, and encryption method of the AP set as the target to be set by WEC.

In step S1005, the CPU 154 determines whether the DPP Configuration processing with the information processing apparatus 101 is successful. Specifically, if the connection information for connecting to the AP set as the target to be set by WEC is received from the information processing apparatus 101 by WEC, the CPU 154 determines that the DPP Configuration processing is successful. If the connection information is not successfully received, the CPU 154 determines that the DPP Configuration processing is failed. If the determination of step S1005 is NO (NO in step S1005), the processing proceeds to step S1003. In step S1003, the CPU 154 ends the DPP standby mode. The processing of this flowchart ends. On the other hand, if the determination of step S1005 is YES (YES in step S1005), the processing proceeds to step S1006. If the DPP Configuration processing is successful, the communication apparatus 151 obtains the SSID, encryption method, and password of the AP.

In step S1006, the CPU 154 determines whether the information about the AP set as the target to be set by WEC, received from the information processing apparatus 101 includes an SSID. If the determination of step S1006 is NO (NO in step S1006), the processing proceeds to step S1003. In step S1003, the CPU 154 ends the DPP standby mode. The processing of this flowchart ends. On the other hand, if the determination of step S1006 is YES (YES in step S1006), the processing proceeds to step S1007.

In step S1007, the CPU 154 determines whether the information about the AP set as the target to be set by WEC, received from the information processing apparatus 101 includes an encryption method. If the determination of step S1007 is NO (NO in step S1007), the processing proceeds to step S1003. In step S1003, the CPU 154 ends the DPP standby mode. The processing of this flowchart ends. On the other hand, if the determination of step S1007 is YES (YES in step S1007), the processing proceeds to step S1008.

In step S1008, the CPU 154 determines whether the information about the AP set as the target to be set by WEC, received from the information processing apparatus 101 includes a password. If the CPU 154 connects to the AP using DPP communication, the CPU 154 may determine whether public key information is included instead of a password. If the security setting of the AP set as the target to be set by WEC is disabled, the information does not need to include a password. If the determination of step S1008 is NO (NO in step S1008), the processing proceeds to step S1003. In step S1003, the CPU 154 ends the DPP standby mode. The processing of this flowchart ends. On the other hand, if the determination of step S1008 is YES (YES in step S1008), the processing proceeds to step S1009. In step S1009, the CPU 154 ends the DPP standby mode. With the DPP standby mode ended, the CPU 154 is unable to respond to a request for the DPP Authentication processing from the information processing apparatus 101.

In step S1010, the CPU 154 ends the network setup mode and deactivates the setup AP. Either the termination of the operation in the network setup mode in step S1010 or the termination of the operation in the DPP standby mode in step S1009 may be performed first. Specifically, the CPU 154 may end the operation in the network setup mode before ending the operation in the DPP standby mode. The CPU 154 may end the operation in the network setup mode and the operation in the DPP standby mode at the same time. Moreover, the processing for ending the operation in the network setup mode, the processing for ending the operation in the DPP standby mode, and the processing for connecting to the AP may be performed in any order.

Figure 12:
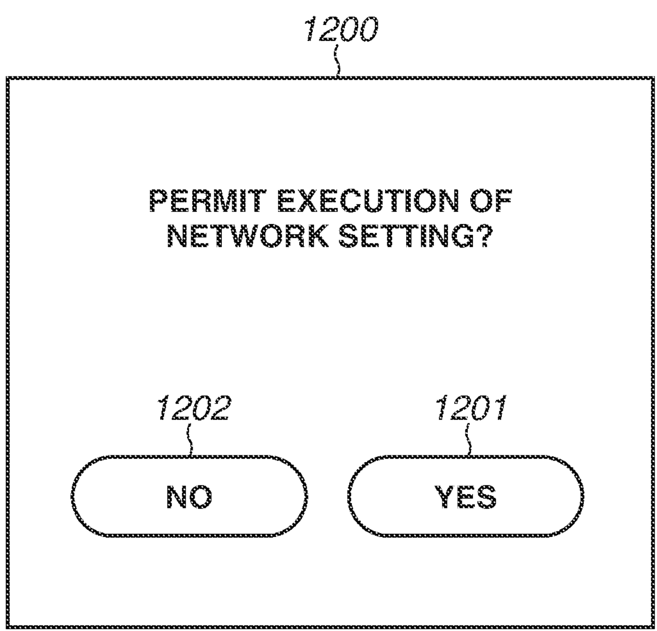
FIG. 12 is a diagram illustrating an example of a connection select screen.

In step S1011, the CPU 154 issues a notification to inquire the user (make the user select) whether to permit execution of a setting (wireless setting) about the wireless connection of the communication apparatus 151. The setting about the wireless connection of the communication apparatus 151 is a setting for connecting to the AP corresponding to the information received from the information processing apparatus 101. More specifically, the CPU 154 displays a screen for making the user select whether to establish the connection to the AP set as the target to be set by WEC corresponding to the information received from the information processing apparatus 101 (hereinafter referred to as a connection select screen) on the display unit 161. FIG. 12 is a diagram illustrating an example of the connection select screen. A connection select screen 1200 displays areas 1201 and 1202.

The area 1201 is an area for making an input to permit the execution of the setting about the wireless connection of the communication apparatus 151. The area 1202 is an area for making an input to not permit the execution of the setting about the wireless connection of the communication apparatus 151. For example, the area 1201 is an area for making an input to permit connection to the AP set as the target to be set by WEC. The area 1202 is an area for making an input to not permit connection to the AP set as the target to be set by WEC.

In step S1012, the CPU 154 determines whether an input to permit the execution of the setting about the wireless connection of the communication apparatus 151 is made. For example, the CPU 154 determines whether the connection to the AP set as the target to be set by WEC is permitted. Specifically, if the area 1201 is operated by the user, the CPU 154 determines that the connection to the AP set as the target to be set by WEC is permitted. If the area 1202 is operated by the user, the CPU 154 determines that the connection to the AP is not permitted. If the determination of step S1012 is YES (YES in step S1012), the processing proceeds to step S1013. If the determination of step S1202 is NO (NO in step S1012), the processing of this flowchart ends. Note that in step S1012, the CPU 154 may activate a timeout timer for the connection select screen. If the count value of the timeout timer for the connection select screen exceeds a threshold without a user operation being made, the processing of this flowchart may be ended. The CPU 154 may repeat the determination of step S1012 until a user operation is made on the connection select screen.

In step S1013, the CPU 154 connects to the AP set as the target to be set by WEC, using the various types of information (SSID, password, and encryption method) about the AP received from the information processing apparatus 101. The processing of this flowchart ends.

FIG. 11 is a flowchart illustrating the WEC execution processing in FIG. 8 (i.e., the processing of step S812 in FIG. 8) started based on the second condition, and corresponds to the operation of the communication apparatus 151 in the sequence of FIG. 4. The flowchart illustrated in FIG. 11 is implemented, for example, by the CPU 154 reading the setting application stored in the ROM 152 or the memory into the RAM 153 and executing the setting application. The flowchart of FIG. 11 is started based on reception of the WEC execution request in the DPP Authentication processing from the information processing apparatus 101 by the communication apparatus 151.

The processing of steps S1101 to S1110 is similar to that of steps S1001 to S1010, respectively. A description thereof will thus be omitted. The processing of step S1111 is similar to that of step S1013. A description thereof will thus be omitted. In this flowchart, there is no step of displaying the connection select screen between steps S1110 and S1111. The processing of step S1111 is performed without the communication apparatus 151 accepting the user's operation after the DPP Configuration processing.

As described above, in the present exemplary embodiment, if the start condition of the operation of the communication apparatus 151 in the network setup mode and the DPP standby mode is the first condition or the third condition, the notification to inquire the user whether to permit the execution of the setting about the wireless connection of the communication apparatus 151 is output. Specifically, the screen for making the user select whether to establish the connection to the AP set as the target to be set by WEC, the information about which is received from the information processing apparatus 101, is displayed on the display unit 161. If a user operation to permit the connection to the AP set as the target to be set by WEC is input, the connection to the AP is established. This can prevent the network setup of the communication apparatus 151 from being executed by a third party in a case where the user is unaware that the communication apparatus 151 is in a state capable of the network setup. If the start condition of the operation of the communication apparatus 151 in the network setup mode and the DPP standby mode is the second condition, the notification to make the user select whether to permit the connection to the AP set as the target to be set by WEC is not output. The communication apparatus 151 then connects to the AP without displaying the connection select screen. The reason is that if the start condition is the foregoing second condition, the user is highly likely to be aware of the execution of the network setup of the communication apparatus 151. This reduces the user's operation procedure and improves usability. As a result, the network setup is executed with high security and convenience.

If a connection between a predetermined AP and the communication apparatus 151 can be established by WEC, the setup can be performed by WEC to omit the user's password input for easy setup. If a connection between a predetermined AP and the communication apparatus 151 is unable to be established by WEC, the setup can be performed by a function different from WEC, whereby the connection between the AP and the communication apparatus 151 can be established with higher reliability.

In addition, in the present exemplary embodiment, if the communication apparatus 151 can connect to a predetermined AP that is the target to be set, the information processing apparatus 101 is controlled to transmit the connection information about the predetermined AP to the communication apparatus 151 by WEC. If the communication apparatus 151 is unable to connect to the predetermined AP that is the target to be set, the information processing apparatus 101 is controlled to transmit connection information about an AP different from the predetermined AP to the communication apparatus 151 by a network setup using the setup communication protocol. An example of the case where the communication apparatus 151 can connect to the predetermined AP is a case where the communication apparatus 151 supports the encryption method to be used for the connection to the predetermined AP. Another example is the case where the communication apparatus 151 supports the frequency band to be used for the connection to the predetermined AP. An example of the case where the communication apparatus 151 is unable to connect to the predetermined AP is a case where the communication apparatus 151 does not support the encryption method to be used for the connection to the predetermined AP. Another example is the case where the communication apparatus 151 does not support the frequency band to be used for the connection to the predetermined AP. In the present exemplary embodiment, if the communication apparatus 151 can connect to the predetermined AP but the encryption method to be used for the connection to the predetermined AP is not WEC-capable, the information processing apparatus 101 is controlled to transmit connection information about an AP different from the predetermined AP to the communication apparatus 151 by a network setup using the setup communication protocol.

The input to permit the execution of the setting about the wireless connection of the communication apparatus 151 may be made using a physical button offscreen. The input to permit the execution of the setting about the wireless connection of the communication apparatus 151 may be made using voice via a voice output unit (not illustrated) instead of the screen display. Only the areas 1201 and 1202 of the connection select screen illustrated in FIG. 12 then may be displayed on the display unit 161, and whether to permit the execution of the setting about the wireless connection of the communication apparatus 151 may be input by a user operation. The input to permit the execution of the setting about the wireless connection of the communication apparatus 151 may be made by the user using voice. Moreover, the communication apparatus 151 may be incapable of displaying the connection select screen due to reasons such as the absence of the display unit 161. In such a case, the setting about the wireless connection of the communication apparatus 151 and the input method for permitting the execution of the setting about the wireless connection of the communication apparatus 151 may be displayed on the display unit 108 of the information processing apparatus 101. For example, a message prompting the user to select whether to permit the connection to the AP and the method for selecting whether to permit the connection to the AP may be displayed on the display unit 108 of the information processing apparatus 101. The communication apparatus 151 then may be configured so that the user can select whether to permit the connection to the AP by using the method for selecting whether to permit the connection to the AP, displayed on the display unit 108 of the information processing apparatus 101. The input method for permitting the execution of the setting about the wireless connection of the communication apparatus 151 here may be an operation on the communication apparatus 151, such as a predetermined operation on the operation unit 159 (physical button).

In the foregoing exemplary embodiment, the setting about the wireless connection of the communication apparatus 151 may be a setting to start communication between the information processing apparatus 101 and the communication apparatus 151 to connect the communication apparatus 151 to the AP. In other words, the CPU 154 may output a notification to make the user select whether to start communication with the information processing apparatus 101 to connect the communication apparatus 151 to the network. Specifically, suppose that the start condition of the operation in the network setup mode and the DPP standby mode is the first condition or the third condition. If a WEC execution request is received in step S712, the CPU 154 may issue a notification to make the user select whether to start execution of WEC between the information processing apparatus 101 and the communication apparatus 151 before starting the execution of WEC. If an instruction to start the execution of WEC between the information processing apparatus 101 and the communication apparatus 151 is input by the user, the CPU 154 may start to execute WEC. In such a configuration, the CPU 154 may regard the connection to the AP set as the target to be set by WEC as being permitted to be established, and connect to the AP without issuing a notification to make the user select whether to permit the connection to the AP. The CPU 154 may issue a notification to make the user select whether to permit the connection to the AP in addition to the notification to make the user select whether to start the execution of WEC. If the start condition of the operation in the network setup mode and the DPP standby mode is the second condition, the CPU 154 may start to execute WEC without issuing the notification to make the user select whether to start the execution of WEC. In such a case, the CPU 154 may connect to the AP without issuing the notification to make the user select whether to permit the connection to the AP set as the target to be set by WEC.

In the present exemplary embodiment, if the first, second, or third condition is satisfied, the network setup mode is started and then the DPP standby mode is started. However, this is not restrictive. For example, if the first, second, or third condition is satisfied, the DPP standby mode may be started before the network setup mode is started.

In other words, if the start condition of the network setup mode and that of the DPP standby mode are the same, the starting order is not limited in particular, and both modes may be started at the same time. Alternatively, either the network setup mode or the DPP standby mode may be started on condition that the other is started. If the first, second, or third condition is satisfied, the communication apparatus 151 may start the network setup mode to establish a connection between the information processing apparatus 101 and the communication apparatus 151, and then start the DPP standby mode based on acquisition of a request to start operation in the DPP standby mode from the information processing apparatus 101.

In the present exemplary embodiment, the communication apparatus 151 ends the DPP standby mode if the execution of WEC is failed. However, the communication apparatus 151 may be configured to not end the DPP standby mode. This enables the network setup to be performed again in response to a network setup execution request or WEC execution request from the information processing apparatus 101.

In the present exemplary embodiment, if either the network setup execution request or the WEC execution request is received, the communication apparatus 151 maintains the mode related to the other execution request activated. Specifically, the communication apparatus 151 maintains the DPP standby mode activated if the network setup execution request is received. However, if either the network setup execution request or the WEC execution request is received, the communication apparatus 151 may deactivate the mode related to the other execution request. For example, if the WEC execution request is received, the communication apparatus 151 may end the network setup mode. Upon reception of either the network setup execution request or the WEC execution request, deactivating the mode related to the other execution request can prevent an unintended network setup from being performed. If the WEC execution request is received, the network setup mode is ended, and the execution of WEC fails, then the communication apparatus 151 starts the network setup mode again based on the failure of the execution of WEC. This enables the network setup to be performed again in response to a network setup execution request from the information processing apparatus 101.

Other Exemplary Embodiments

The foregoing exemplary embodiment may be applied to a case where a network setup is performed using the setup communication protocol. Specifically, suppose that the network setup using the setup communication protocol illustrated in FIG. 6 is performed in step S710 (S720) of FIG. 7 or step S809 (S819) of FIG. 8. If the start condition of the operation in the network setup mode and the DPP standby mode is the first or third condition, the CPU 154 may output a notification before connecting to the AP in step S604. The connection to the AP is then established if an input to permit the connection to the AP is made by a user operation. Now, suppose again that the network setup using the setup communication protocol illustrated in FIG. 6 is performed in step S710 (S720) of the FIG. 7 or step S809 (S819) of FIG. 8. If the start condition of the network setup mode and the DPP standby mode is the second condition, the CPU 154 does not need to output a notification before connecting to the AP in step S604. Moreover, the setting about the wireless connection of the communication apparatus 151 may be a setting to establish a connection between the information processing apparatus 101 and the communication apparatus 151 to connect the communication apparatus 151 to the AP. More specifically, if the start condition of the operation in the network setup mode and the DPP standby mode is the first condition or the third condition, the CPU 154 may output a notification to make the user select whether to establish the connection with the information processing apparatus 101 to connect the communication apparatus 151 to the AP. Specifically, the CPU 154 may output a notification to make the user select whether to start execution of the network setup using the setup communication protocol before starting the execution of the network setup using the setup communication protocol. The CPU 154 then may execute the network setup if an instruction to start the execution of the network setup between the information processing apparatus 101 and the communication apparatus 151 is input by the user. In such a configuration, the CPU 154 may regard the connection to the AP as being permitted to be established, and connect to the AP without issuing the notification to make the user select whether to permit the connection to the AP. The CPU 154 may issue a notification to make the user select whether to permit the connection to the AP in addition to the notification to make the user select whether to start the execution of the network setup. If the start condition of the operation in the network setup mode and the DPP standby mode is the second condition, the CPU 154 may start to perform the network setup without issuing the notification to make the user select whether to start the execution of the network setup. In such a case, the CPU 154 may connect to the information processing apparatus 101 and the AP without issuing the notification to make the user select whether to permit the connection to the AP.

As described above, the information processing apparatus 101 may issue a connection request to establish a direct connection with the communication apparatus 151 in step S602 of FIG. 6. In such a case, the communication apparatus 151 ends the network setup mode and shifts the connection mode to the P2P mode. The setting about the wireless connection of the communication apparatus 151 in the case where the CPU 154 receives the connection request to establish the direct connection is thus a setting to establish a direct connection between the information processing apparatus 101 and the communication apparatus 151 based on the connection request received from the information processing apparatus 101. In other words, the CPU 154 may output a notification to make the user select whether to permit the establishment of the direct connection with the information processing apparatus 101.

The foregoing exemplary embodiment may be applied only to a case where a network setup is performed by using either the setup communication protocol or the DPP. For example, suppose that the network setup using the DPP is performed. In such a case, a notification to make the user select whether to permit the connection to the AP is output if the start condition of the operation in the network setup mode and the DPP standby mode is the first condition or the third condition. Now, suppose that the network setup using the setup communication protocol is performed. In such a case, the notification to make the user select whether to permit the connection to the AP does not need to be output even when the start condition of the operation in the network setup mode and the DPP standby mode is the first condition or the third condition.

In the foregoing exemplary embodiment, if the start condition of the operation in the network setup mode and the DPP standby mode is the first condition or the third condition, the flowchart of FIG. 10 is performed.

If the start condition of the operation in the network setup mode and the DPP standby mode is the second condition, the flowchart of FIG. 11 is performed. However, a common flowchart may be started regardless of whether the start condition is the first, second or third condition. In such a case, the CPU 154 of the communication apparatus 151 stores information indicating based on which of the first, second, and third conditions the operation of the communication apparatus 151 in the network setup mode is started (start condition information) in the memory. In executing WEC in the common flowchart, the CPU 154 may perform the flowchart illustrated in FIG. 13, for example.

The processing of steps S1301 to S1310 is similar to that of steps S1001 to S1010 in FIG. 10, respectively. A description thereof will thus be omitted. In step S1311, the CPU 154 refers to the start condition information stored in the memory, and determines based on which of the first, second, and third conditions the operation of the communication apparatus 151 in the network setup mode and the DPP standby mode is started. In step S1311, if the start condition is determined to be the first or third condition (YES in step S1311), the processing proceeds to step S1313. If the start condition is determined to be the second condition (NO in step S1311), the processing proceeds to step S1312. The processing of step S1312 is similar to that of step S1013. The processing of steps S1313 to S1315 is similar to that of steps S1011 to S1013, respectively. A description thereof will thus be omitted.

In the foregoing exemplary embodiment, the connection information about the connected AP is transmitted by WEC, and the determinations of steps S211 to S213 are made with regard to the connected AP. However, such a configuration is not restrictive. Connection information about an AP different from the connected AP may be transmitted, and the determinations may be made with regard to the AP different from the connected AP. Specifically, an example of the AP different from the connected AP may be an AP to which the information processing apparatus 101 is not connected when the setting operation is made, but has been connected at any timing before the setting operation. Another example may be an AP selected by the user from a list of APs to which the information processing apparatus 101 has been connected. The reason is that connection information about an AP to which the information processing apparatus 101 has been connected at any timing can be transmitted by WEC if such connection information is stored by the OS.

In the foregoing exemplary embodiment, an easy setup with the user's password input omitted can be implemented by performing the setup by WEC. However, the setup performed by WEC in the foregoing exemplary embodiment may be performed by other functions using other protocols instead. For example, the setup performed by WEC can be performed by a function using the HTTP instead. Like WEC, the function using the HTTP can also similarly implement an easy setup with the user's password input omitted. In the foregoing exemplary embodiment, a setup using the setup communication protocol (such as SNMP) is performed. However, the setup performed using the setup communication protocol in the foregoing exemplary embodiment may be performed by other functions using other protocols instead. For example, the setup performed using the setup communication protocol may be performed by a function using the HTTP instead. Aside from the setup using WEC and the setup using the setup communication protocol, a setup using a third protocol can also be performed. An example of the third protocol is the HTTP. In the setup using the third protocol, a notification to make the user select whether to permit the connection to the AP may be output if the start condition of the operation in the network setup mode and the DPP standby mode is the first condition or the third condition. In the setup using the third protocol, the output of the notification to make the user select whether to permit the connection to the AP may be omitted even when the start condition of the operation in the network setup mode and the DPP standby mode is the first condition or the third condition.

In the foregoing exemplary embodiment, the network setup in step S224 is described to transmit the connection information via the Wi-Fi connection between the information processing apparatus 101 and the communication apparatus 151. However, such a configuration is not restrictive. For example, in the network setup, the connection information may be transmitted via a connection between the information processing apparatus 101 and the communication apparatus 151 using a communication method other than Wi-Fi, such as Bluetooth® Low Energy. In such a configuration, the information processing apparatus 101 can connect to the communication apparatus 151 by Bluetooth® Low Energy while maintaining the Wi-Fi connection with the connected AP. In other words, the connection information about the AP currently connected can be transmitted as the connection information about the connected AP. Even in such a configuration, a communication protocol different from the DPP is used.

In the foregoing exemplary embodiment, in step S207, various types of information are described to be obtained via the Wi-Fi connection between the AP activated in the communication apparatus 151 operating in the network setup mode and the information processing apparatus 101. However, such a configuration is not restrictive. The various types of information may be obtained by reading a QR code as in step S220, or via communication using other communication methods such as NFC and Bluetooth® Low Energy.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-169499, filed Oct. 15, 2021, which is hereby incorporated by reference herein in its entirety.

What is claimed is:

1. A communication apparatus configured to communicate with an information processing apparatus, the communication apparatus comprising:

at least one memory storing a program; and at least one processor that, upon execution of the stored program, is configured to operate as:

an output control unit configured to, in a case where a start condition of a predetermined state to receive connection information from the information processing apparatus is a first condition, the first condition being a condition that the communication apparatus in a state where initialization is not completed is powered on, perform control to output a predetermined notification, the predetermined notification including a first message, the first message being for a confirmation regarding permission to execute predetermined processing for establishing a connection to an access point, and in a case where the start condition of the predetermined state is a second condition different from the first condition and corresponding to execution of a predetermined operation for entering the predetermined state on the communication apparatus, the predetermined operation being different from an operation for powering on the communication apparatus, perform control not to output the predetermined notification, the connection information being intended to establish the connection between the communication apparatus and the access point; and a control unit configured to, after the predetermined notification is output, perform control to, in a case where a predetermined condition is satisfied without making a particular input indicating not granting permission in response to the first message, execute predetermined processing, and in a case where the particular input is made, not execute the predetermined processing.

2. The communication apparatus according to claim 1, wherein the predetermined notification is at least one of the following: a notification issued before processing configured to connect the communication apparatus and the access point corresponding to the connection information received from the information processing apparatus is performed; a notification issued before processing configured to establish a connection between the information processing apparatus and the communication apparatus is performed, the connection information being received via the connection; and a notification issued before communication between the information processing apparatus and the communication apparatus is performed, the communication being intended to connect the communication apparatus to the access point.

3. The communication apparatus according to claim 1, wherein the predetermined notification is at least one of the following: a notification indicating whether to perform processing configured to connect the communication apparatus and the access point corresponding to the connection information received from the information processing apparatus; a notification indicating whether to perform processing configured to establish a connection between the information processing apparatus and the communication apparatus; and a notification indicating whether to perform communication between the information processing apparatus and the communication apparatus, the communication being intended to connect the communication apparatus to the access point.

4. The communication apparatus according to claim 1, wherein the predetermined processing is processing configured to connect the communication apparatus and the access point corresponding to the connection information received from the information processing apparatus.

5. The communication apparatus according to claim 1, wherein the predetermined processing is processing configured to establish a connection between the information processing apparatus and the communication apparatus and receive the connection information via the connection, and wherein the communication apparatus is configured to, if the connection information about the access point is received from the information processing apparatus via the connection between the information processing apparatus and the communication apparatus, connect to the access point.

6. The communication apparatus according to claim 1, wherein the predetermined processing is processing configured to perform communication between the information processing apparatus and the communication apparatus, the communication being intended to connect the communication apparatus to the access point, and wherein the communication apparatus is configured to, in a case where the connection information about the access point is received from the information processing apparatus via the communication between the information processing apparatus and the communication apparatus, connect to the access point.

7. The communication apparatus according to claim 1, wherein the predetermined state is a state to receive the connection information from the information processing apparatus and a state to transmit direct connection information about the communication apparatus to the information processing apparatus, the connection information being intended to establish the connection between the communication apparatus and the access point, the direct connection information being intended to directly connect the information processing apparatus and the communication apparatus, and wherein the communication apparatus is configured to, in a case where a first request is received from the information processing apparatus in the predetermined state, receive the connection information, and in a case where a second request is received from the information processing apparatus in the predetermined state, transmit the direct connection information.

8. The communication apparatus according to claim 7, wherein the predetermined processing is processing configured to directly connect the information processing apparatus and the communication apparatus based on a connection request received from the information processing apparatus.

9. The communication apparatus according to claim 1, wherein the communication apparatus is configured to, in a case where the start condition of the predetermined state is the second condition, execute the predetermined processing without outputting the predetermined notification.

10. The communication apparatus according to claim 1, wherein the first condition is that the communication apparatus in a state where initialization is not completed be powered on so that the entire communication apparatus is powered up.

11. The communication apparatus according to claim 10, wherein the state where the initialization is not completed is a state where the communication apparatus in a factory shipment state is activated by a user for a first time.

12. The communication apparatus according to claim 1, wherein the first condition is that the communication apparatus in a state where no connection mode is set be powered on so that the entire communication apparatus is powered up.

13. The communication apparatus according to claim 1, wherein the first condition is that a state where a connection mode of the communication apparatus is set be changed into a state where no connection mode of the communication apparatus is set.

14. The communication apparatus according to claim 1, wherein the first input is an input indicating that execution of the predetermined processing is permitted, and the second input is an input indicating that the execution of the predetermined processing is not permitted.

15. The communication apparatus according to claim 1, wherein a communication protocol used in communication between the information processing apparatus and the communication apparatus in the predetermined state is a Device Provisioning Protocol.

16. The communication apparatus according to claim 1, wherein a communication protocol used in communication between the information processing apparatus and the communication apparatus in the predetermined state is Hypertext Transfer Protocol.

17. The communication apparatus according to claim 1, wherein a communication protocol used in communication between the information processing apparatus and the communication apparatus in the predetermined state is Simple Network Management Protocol.

18. The communication apparatus according to claim 1, wherein the output unit is configured to, in a case where the communication apparatus is in the predetermined state and the start condition of the predetermined state is the first condition, output the predetermined notification, and in a case where the communication apparatus is in the predetermined state and the start condition of the predetermined state is the second condition, not output the predetermined notification, wherein the output unit is configured to, in a case where the communication apparatus is in a specific state to receive the connection information from the information processing apparatus, not output the predetermined notification regardless of whether the start condition of the first state is the first condition or the second condition, the specific state being different from the predetermined state, and wherein a first communication protocol used in the predetermined state and a second communication protocol used in the specific state are different.

19. A method for controlling a communication apparatus configured to communicate with an information processing apparatus, the method comprising:

in a case where a start condition of a predetermined state to receive connection information from the information processing apparatus is a first condition, the first condition being a condition that the communication apparatus in a state where initialization is not completed is powered on, outputting a predetermined notification, the predetermined notification including a first message, the first message being for a confirmation regarding permission to execute predetermined processing for establishing a connection to an access point, and in a case where the start condition of the predetermined state is a second condition different from the first condition, and corresponding to execution of a predetermined operation for entering the predetermined state on the communication apparatus, the predetermined operation being different from an operation for powering on the communication apparatus, not outputting the predetermined notification, the connection information being intended to establish the connection between the communication apparatus and the access point; and after the predetermined notification is output, in a case where a predetermined condition is satisfied without making a particular input indicating not granting permission in response to the first message, executing predetermined processing and in a case where the particular input is made, not executing the predetermined processing.

20. A non-transitory computer-readable storage medium storing computer-executable instructions that, when executed by a computer of a communication apparatus configured to communicate with an information processing apparatus, cause the computer to perform a method comprising:

in a case where a start condition of a predetermined state to receive connection information from the information processing apparatus is a first condition, the first condition being a condition that the communication apparatus in a state where initialization is not completed is powered on, outputting a predetermined notification, the predetermined notification including a first message, the first message being for a confirmation regarding permission to execute predetermined processing for establishing a connection to an access point, and in a case where the start condition of the predetermined state is a second condition different from the first condition, and corresponding to execution of a predetermined operation for entering the predetermined state on the communication apparatus, the predetermined operation being different from an operation for powering on the communication apparatus, not outputting the predetermined notification, the connection information being intended to establish the connection between the communication apparatus and the access point; and after the predetermined notification is output, in a case where a predetermined condition is satisfied without making a particular input indicating not granting permission in response to the first message, executing predetermined processing and in a case where the particular input is made, not executing the predetermined processing.

21. The communication apparatus according to claim 1, wherein the predetermined operation is an operation performed by a user.

22. The communication apparatus according to claim 1, wherein the predetermined operation is an operation on a hardware button or a software button.

* * * * *